(12) United States Patent
Matsuzoe et al.

(10) Patent No.: US 6,839,148 B1
(45) Date of Patent: Jan. 4, 2005

(54) IMAGE INPUT APPARATUS

(75) Inventors: Susumu Matsuzoe, Onojo (JP);
Takeshi Nakayama, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 923 days.

(21) Appl. No.: 09/609,697

(22) Filed: Jul. 6, 2000

(30) Foreign Application Priority Data

| Jul. 8, 1999 | (JP) | 11-194019 |
| Sep. 3, 1999 | (JP) | 11-250009 |
| Sep. 3, 1999 | (JP) | 11-250013 |

(51) Int. Cl.[7] .......................................... G06F 15/00
(52) U.S. Cl. ................... 358/1.15; 358/434; 358/409; 358/442; 358/426; 358/437; 709/225; 709/227
(58) Field of Search ............................. 358/1.15, 434, 358/409, 437, 412, 468, 442, 426; 709/225, 227

(56) References Cited

U.S. PATENT DOCUMENTS

| 6,334,161 B1 | * | 12/2001 | Suzuki et al. | 710/29 |
| 6,476,937 B1 | * | 11/2002 | Yoshida | 358/434 |
| 6,584,534 B1 | * | 6/2003 | Kobayashi | 710/305 |
| 6,606,320 B1 | * | 8/2003 | Nomura et al. | 370/395.1 |

* cited by examiner

*Primary Examiner*—Edward Coles
*Assistant Examiner*—Jason Sherrill
(74) *Attorney, Agent, or Firm*—Stevens, Davis, Miller & Mosher, LLP

(57) ABSTRACT

An image input apparatus includes a reading unit for reading a manuscript image, and a communication unit for transferring the image data, which is read by the reading unit, and control data to another apparatus. The communication unit has a first mode in which a periodic data transfer can be assured, and a second mode in which the periodic data transfer cannot be assured. The communication unit transfers the image data in the first mode, and the control data in the second mode.

8 Claims, 20 Drawing Sheets

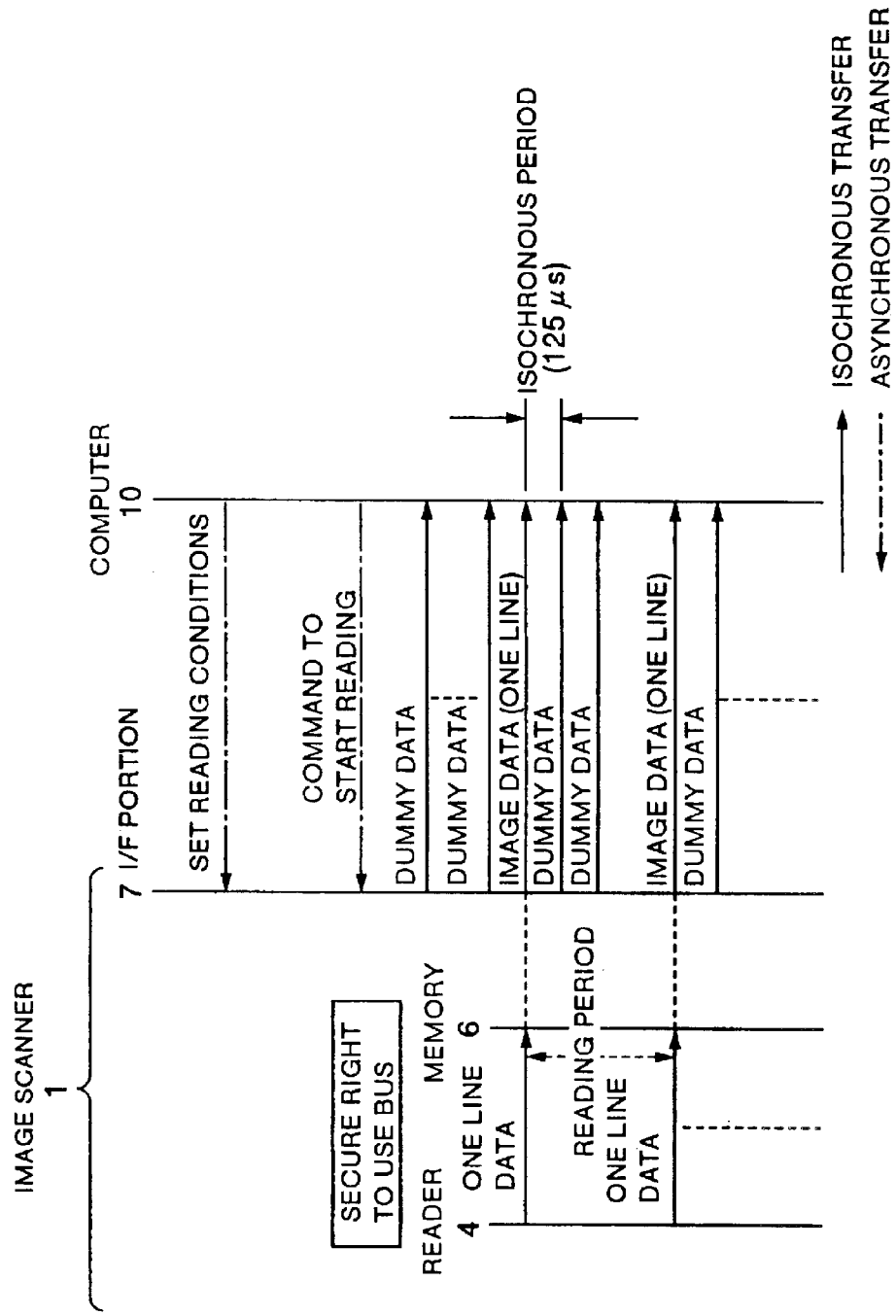

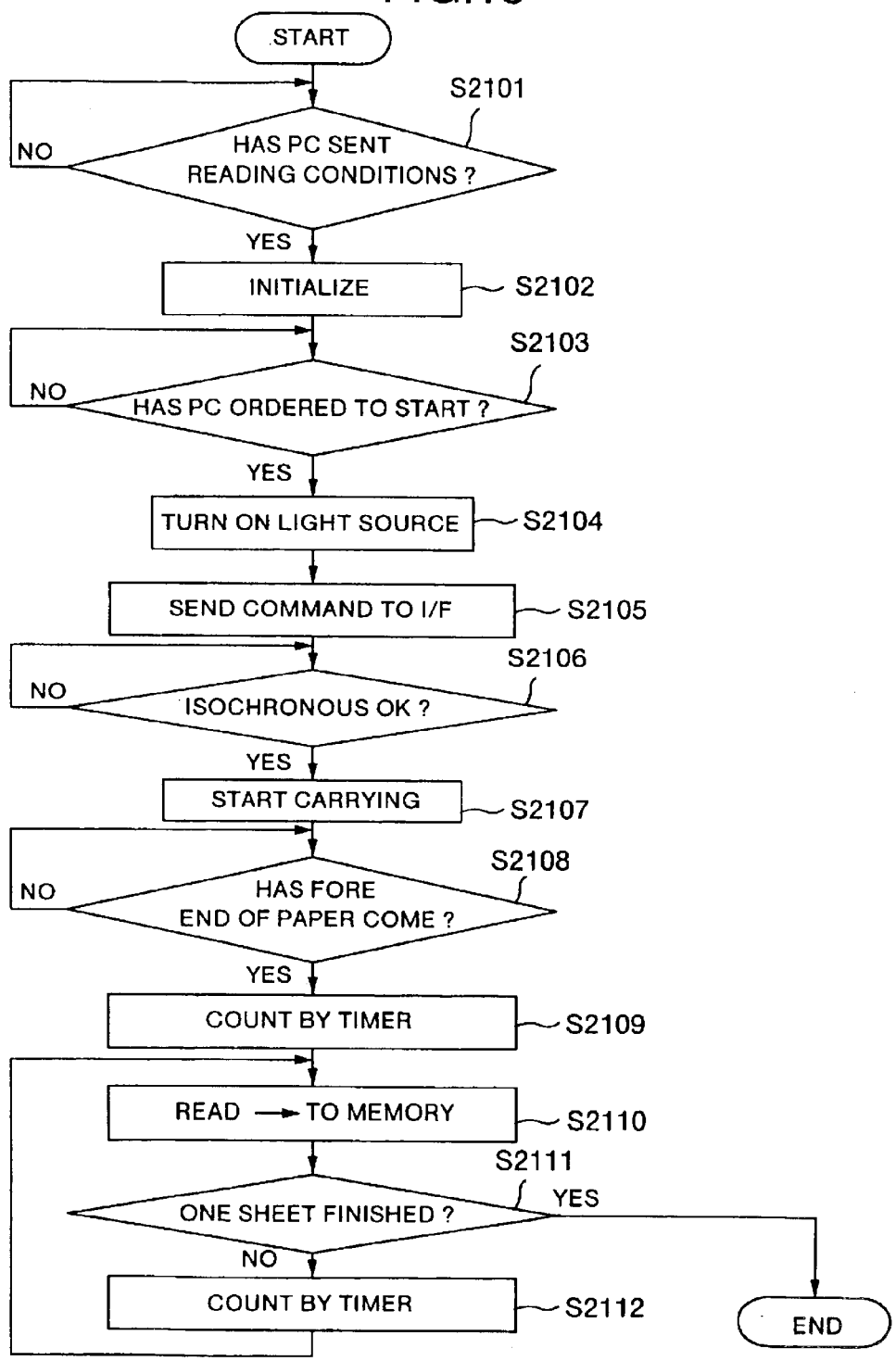

IMAGE INPUT APPARATUS

BACKGROUND OF THE INVENTION

The present invention relates to an image input apparatus connected to another apparatus via a bus, and particularly to an image input apparatus which reads a manuscript image to transfer it to another apparatus.

The image input apparatus such as an image scanner is connected via a bus to other apparatus such as a higher-level apparatus of a computer, and reads a manuscript image such as a picture, a photograph and a document to transfer the read image data to the other apparatus. The transfer of the image data is performed by use of a parallel interface such as Centronics-conformable interface and SCSI (Small Computer System Interface) or a serial interface such as RS-232C and RS-422.

In the communication systems using these interfaces, the asynchronous communication is performed. When the communication is performed with another peripheral equipment connected to these interfaces, the image scanner makes the mediation for securing the right to use the bus each time it transmits or receives data. After acquiring the right to use, an output of a command and like and a response of a computer thereto are performed.

FIG. 11 is a timing chart of an image transfer in an image scanner using a conventional communication system.

First, the computer transfers to the image scanner the setting data for the reading conditions such as the size of the manuscript image and the reading resolution. The image scanner sends OK to the computer after receiving the setting data and finishing the setting of the units. Upon receiving it, the computer outputs a reading-start command to the image scanner. When receiving this reading-start command, the image scanner sends OK to the computer and starts to read the image.

The image scanner reads each line of the manuscript image by use of a reading unit, and stores it in a memory one by one. At this time, in the case of the image scanner using an automatic draft feeder (ADF), it is very difficult to halfway stop the sheet which is being automatically fed. Also, in the case of a flat head (FB) type image scanner, halfway stopping the reading operation will cause a shift in that part of the sheet, so that the read image has stripes. Therefore, once the manuscript image starts to be read, the reading operation cannot be stopped until one sheet of manuscript image is finished to read.

The computer requests the image scanner to transfer the read image data. The image scanner responds to this request to transfer the image data, which is stored in the memory, to the computer via the interface. When the image data is transferred to the computer, it is necessary to secure the right to use the bus each time the computer sends to the transfer request, and thus the image data cannot be transferred with a constant period.

Therefore, when the image scanner cannot secure the right to use the bus for the image data transfer, it takes time for the image data to be completely transferred. As a result, the image scanner needs a memory having a capacity capable of at least storing image data of one-sheet image. Thus, it is a neck to provide this memory when we consider reducing the cost of the image scanner (the first problem).

In addition, when the sheets of manuscript image are automatically fed by the ADF, command data indicating the end of reading each manuscript sheet is transferred to the computer each time one sheet of manuscript image is read out. Then, the image data is again transferred in response to the transfer request from the computer. At this time, since time is necessary to secure the right to use the bus if the bus is busy, the next sheet of manuscript image cannot be started to read.

When a plurality of sheets of manuscript are continuously fed and read, it is necessary to shorten the intervals at which the sheets are read, in order to speed up the processing. If one of the sheets cannot be started to read when the bus is busy, the processing speed cannot be increased. Moreover, if a large memory is provided enough to store the image data of all sheets of manuscript, all image data can transferred at a time. However, the larger the number of sheets is read, the larger the memory capacity becomes (the second problem).

In addition, when the image scanner cannot secure the right to use the bus for data transfer, time is taken for the image data to be completely transferred. Moreover, error checking is performed when the transferred image data is transmitted and received. If error is caused, the image data is again transferred. In other words, since the reading process is not intermitted even when the image data is again transmitted, the read image data is accumulated on the image scanner side.

The result is that the image scanner is required to include a memory having a capacity capable of storing the image data corresponding to at least one sheet of manuscript. Therefore, it is again a neck to provide this memory when we consider reducing the cost of the image scanner (the third problem).

SUMMARY OF THE INVENTION

It is an object of the present invention to provide an image input apparatus capable of transferring data from a memory of which a capacity is as small as possible, thereby solving the first problem.

It is another object of the present invention to provide an image input apparatus capable of periodically transferring image data corresponding to a plurality of sheets of manuscript using a memory of which a capacity is as small as possible, thereby solving the second problem.

It is still another object of the invention to provide an image input apparatus capable of a data transfer using a memory of which a capacity is as small as possible, thereby solving the third problem.

A first image input apparatus according to the present invention comprises communication means for performing a transfer of image data, which is read out by reading means, to another apparatus and a transfer of control data to the other apparatus. Here, the communication means has a first mode in which a periodic data transfer can be assured, and a second mode in which the periodic data transfer cannot be assured. The communication means transfers the image data in the first mode, and transfers the control data in the second mode.

Therefore, since the image data is transferred in the first mode in which the periodic transfer can be assured, the image data read out by the reading means can be periodically transferred to the other apparatus, so that the image data does not stay the image input apparatus. Thus, the capacity of the memory for storing the image data can be made as small as possible. Also, since the control data is transferred in the second mode in which the periodic transfer cannot be assured to the other apparatus which does not need the periodic data transfer, the transfer band in the first mode can be effectively used.

In a second input unit according to the present invention, when a plurality of sheets of manuscript image as supplied are sequentially read and image data of each of the plurality of sheets of the manuscript image as read is transferred to another apparatus, the image data of one sheet is transferred in a transfer mode in which a periodic data transfer can be assured, and then status data indicating the state of the image input apparatus is transferred in the transfer mode.

Therefore, since the image data and the status data are transferred in the transfer mode in which the periodic data transfer can be assured, the right to use the bus can be immediately acquired by the time at which the image data of the next sheet starts to be processed, so that the image data of the plurality of sheets can be periodically transferred. Consequently, it is possible to increase the image input processing speed. Also, since the image data does not stay in the image input apparatus, the capacity of the memory for storing the image data can be made as small as possible.

A third image input apparatus according to the present invention transfers image data, which is read by reading means, in a transfer mode in which a periodic data transfer can be assured, and again transfers the same data as the transferred image data in a free period of the transfer mode.

Therefore, since the image data is transferred in the transfer mode in which the periodic data transfer can be assured, the image data read by the reading means can be periodically transferred to another apparatus. In addition, since the same image data as the transferred image data is again transferred in the free period (in which there is no image data to be transferred) of the transfer mode, the re-transferred image data can be used when error occurs in the first transmission and reception of the image data. In other words, the image data can be periodically transferred to the other apparatus irrespective of whether or not error occurs in the transmission and reception of the image data. Consequently, the image data does not stay in the image input apparatus, so that the capacity of the memory for storing the image data can be made as small as possible.

An image input apparatus according to the first aspect of the present invention comprises: reading means for reading a manuscript image; and communication means for performing a transfer of image data, which is read by the reading means, to another apparatus and a transfer of control data to the other apparatus, wherein the communication means has a first mode in which a periodic data transfer can be assured, and a second mode in which the period data transfer cannot be assured, and transfers the image data and the control data in the first and second modes, respectively.

Thus, since the image data is transferred in the first mode in which the periodic transfer can be assured, the image data read by the reading means is periodically transferred to the other apparatus. As a result, the image data does not stay in the image input apparatus, so that the capacity of the memory for storing the image data can be made as small as possible. Moreover, since the control data is transferred in the second mode in which the periodic transfer cannot be assured to the other apparatus which does not need the periodic transfer, the transfer band in the first mode can be effectively used.

An image input apparatus according to the second aspect of the present invention comprises: reading means for reading a manuscript image; and communication means for performing a transfer of image data read by the reading means to another apparatus, wherein the communication means has a mode in which a periodic data transfer can be assured, and transfers the image data in the mode and transfers data other than the image data in a period in which there is no image data to be transferred.

Therefore, the information about the image input apparatus can be transmitted to the other apparatus by making effective use of the period in which the transfer of the image data is not performed.

An image input apparatus according to the third aspect of the present invention comprises: reading means for reading a manuscript image; and communication means for transferring image data read by the reading means to another apparatus, wherein the communication means has a mode in which a periodic data transfer can be assured, and when the image data is transferred in the mode, the communication means transfers data other than the image data until the transfer of the image data is started.

Therefore, the state of the image input apparatus can be transferred to the other apparatus by making effective use of the period in which the image data is not transferred, until the transfer of the image data is started. Also, since the image data is periodically transferred immediately after the manuscript sheet starts to be read, the image data can be started to transfer without delay. As a result, the data transfer can be made using a smallest-capacity memory.

An image input apparatus according to the fourth aspect of the present invention comprises: supply means for successively feeding a plurality of manuscript sheets; reading means for sequentially reading the plurality of manuscript sheets fed by the supply means; and communication means for transferring image data of each of the plurality of manuscript sheets, which is read by the reading means, to another apparatus, wherein the communication means has a transfer mode in which a periodic data transfer can be assured, and transfers status data, which indicates a state of the image input apparatus, in the transfer mode after transferring one-sheet image data in the transfer mode.

Therefore, after the read image data is periodically transferred, the status data can be surely transferred without delay. The other apparatus can know that the image data of one sheet has been completely transferred from the transmission of this status data. The next process can be successively performed on the basis of this status data. That is, since the image data and status data are transferred in the transfer mode in which the periodic data transfer can be assured, the right to use the bus can be immediately acquired by the time in which the image data of the next sheet starts to be processed. As a result, the image data of the plurality of sheets can be periodically transferred, so that the image input processing speed can be increased. Also, since the image data does not stay in the image input apparatus, the capacity of the memory for storing the image data can be made as small as possible.

An image input apparatus according to the fifth aspect of the present invention comprises: supply means for successively feeding a plurality of manuscript sheets; reading means for sequentially reading the plurality of manuscript sheets fed by the supply means; and communication means for transferring image data of each of the plurality of manuscript sheets, which is read by the reading means, to another apparatus, wherein the communication means has a transfer mode in which a periodic data transfer can be assured, transfers the image data of the plurality of manuscript sheets in the transfer mode, and transfers status data, which indicates a state of the image input apparatus, in the transfer mode in an interval between the image data of the plurality of manuscript sheets to be transferred.

Therefore, the status data can be surely transferred without delay by squeezing into the image data of the plurality of manuscript sheets to be transferred. The other apparatus can know the interval between the image data of one sheet and the image data of the next sheet from the transmission of the status data, so that the image data of the next sheet can be successively transferred on the basis of the status data. In other words, since the image data and status data are successively transferred in the transfer mode in which the periodic data transfer can be assured, the right to use the bus can be acquired before the image data of the next sheet starts to be processed. As a result, the image data of the plurality of sheets can be periodically transferred, so that the image input processing speed can be increased. Also, since the image data does not stay in the image input apparatus, the capacity of the memory for storing the image data can be made as small as possible.

An image input apparatus according to the sixth aspect of the present invention is the image input apparatus according to the fourth or fifth aspect of the present invention, wherein the status data indicates whether or not there is any manuscript sheet in the supply means.

Therefore, the other apparatus can know that the image data of the next manuscript sheet is successively transferred by receiving the status data, so that it is possible to process the successive image data more effectively.

An image input apparatus according to the seventh aspect of the present invention comprises: reading means for reading a manuscript image; and communication means for transferring image data, which is read by the reading means, to another apparatus, wherein the communication means has a transfer mode in which a periodic data transfer can be assured, transfers the image data in the transfer mode, and transfers the same image data as the transferred image data in a free period of the transfer mode.

Therefore, since the image data is transferred in the transfer mode in which the periodic transfer can be assured, the image data read by the reading means is periodically transferred to the other apparatus. Moreover, since the same image data as the image data transferred in the transfer mode is again transferred in the free period of the transfer mode, the re-transmitted image data can be used for the case in which error occurs when the image data is first transmitted and received. That is, the image data can be transferred to the other apparatus irrespective of whether or not error occurs when the image data is transmitted and received.

An image input apparatus according to the eighth aspect of the present invention comprises: reading means for reading a manuscript sheet; and communication means for transferring image data, which is read by the reading means, to another apparatus, wherein the communication means has a transfer mode in which a periodic data transfer can be assured, transfers the image data in the transfer mode, and successively transfers the same image data as the transferred image data in the transfer mode.

Therefore, since the image data is transferred in the transfer mode in which the periodic transfer can be assured, the image data read by the reading means is periodically transferred to the other apparatus. Also, the image data to be transferred can be accurately and successively transferred twice or more, and thus the successively transferred image data can be immediately used for the case in which error occurs when the image data is transmitted and received. In other words, even the other apparatus to which the image data is transferred can decrease the time necessary for the image data to be processed.

An image input apparatus according to the ninth aspect of the present invention is the image input apparatus according to the seventh or eighth aspect of the present invention, wherein the image data to be transferred is divided into predetermined units.

Therefore, when the predetermined unit is the reading of one line of the sheet by the reading means, for example, the image data can be periodically transferred every line, so that the capacity of the memory can be set to the capacity corresponding to the predetermined unit.

BRIEF DESCRIPTION OF THE DRAWINGS

FIG. 2A is a diagram showing the detail of an isochronous region, and FIG. 2B is a diagram showing the detail of an asynchronous region;

FIG. 3 is a timing chart of an image transfer in the image input apparatus shown in FIG. 1;

FIG. 1B is a flowchart of a reading process in an ADF;

DETAILED DESCRIPTION OF THE EMBODIMENTS

Embodiments of the present invention will be described with reference to FIGS. 1–10 and 12–20.

(First Embodiment)

Figure 1:
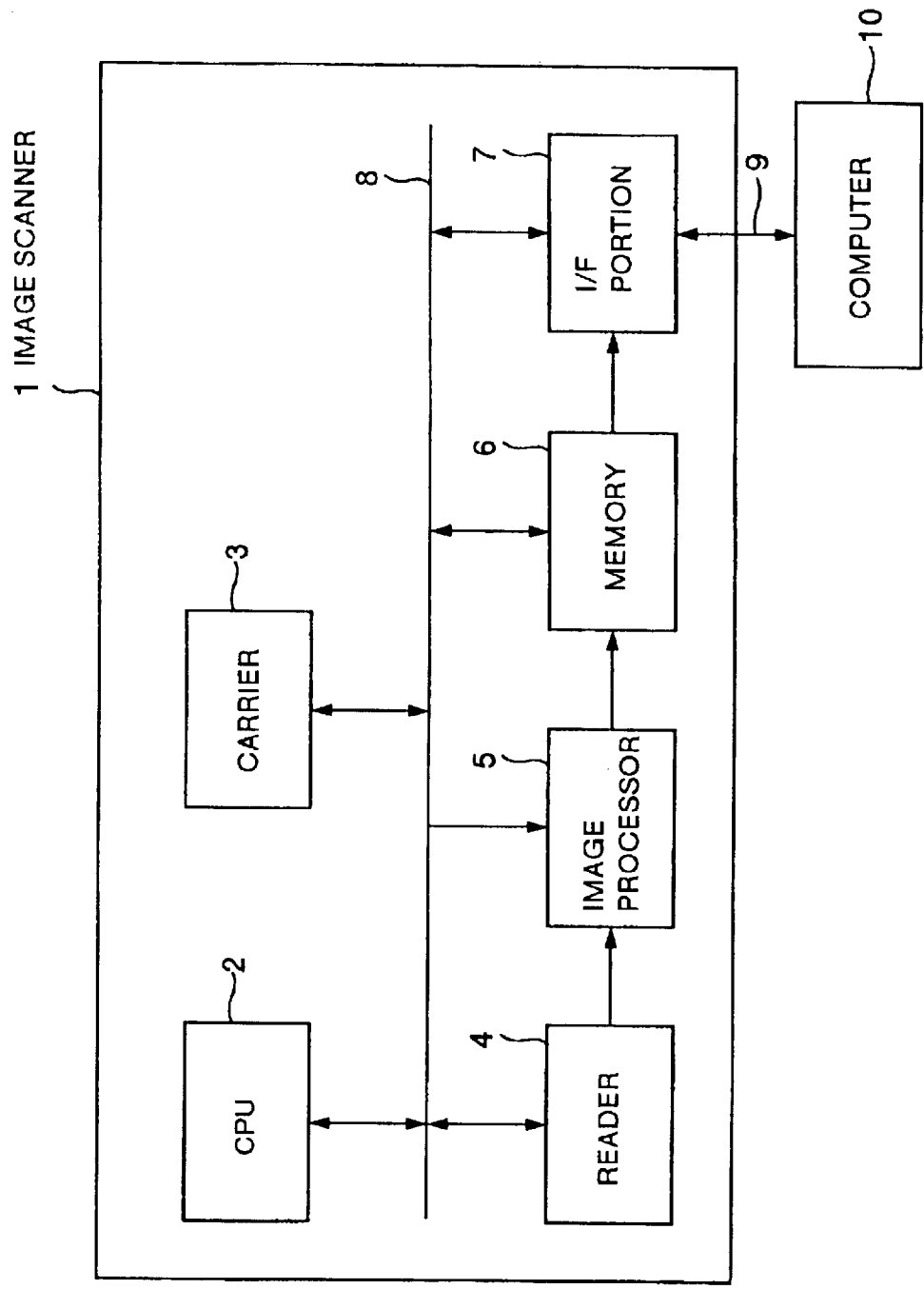
FIG. 1 is a block diagram of a hardware structure of an image input apparatus of a first embodiment of the present invention.

FIG. 1 is a diagram showing a hardware structure of an image input apparatus according to a first embodiment of the present invention.

As shown in FIG. 1, an image scanner 1 as the image input apparatus according to the first embodiment is connected via a bus to a computer 10 as another apparatus. The IEEE standard 1394 (IEEE: Institute of Electrical and Electronic Engineers, Inc.) interface for fast serial transmission is used as communication means for performing a data communication between the image scanner 1 and the computer 10.

The image scanner 1 includes a CPU 2 as control means for controlling the whole image scanner 1; a carrier 3 for feeding, carrying and discharging sheets of manuscript image; a reader 4 as reading means for reading images on the sheets of manuscript and converting them into image data; an image processor 5 for converting the analog image data from the reader 4 into digital image data, and processing to convert the digital image data to binary data; a memory 6 as storage means for storing the processed image data; and an I/F portion 7 as communication means for controlling the communication according to the IEEE standard 1394. The constitutional blocks 1–7 are interconnected by a bus 8. The image scanner 1 and the computer 10 are connected together through a cable 9 of the IEEE standard 1394 interface.

In the IEEE standard 1394 interface, it is possible to perform the isochronous transfer (synchronous transfer) which can assure a periodical data transfer, and the asynchronous transfer which cannot assure the periodical data transfer. The isochronous transfer mode can assure the transfer with a constant speed but with delay not allowed (i.e., the transfer at a constant band within periodically continuous time), but does not perform any re-transmission due to error. Therefore, the isochronous transfer assures the transfer band and transfer time of data, but does not assure communication error. On the contrary, the asynchronous transfer performs the transfer using a band width which is not used in the isochronous transfer, and performs the re-transmission when communication error occurs so as to assure the correct data transfer.

Figure 2A:
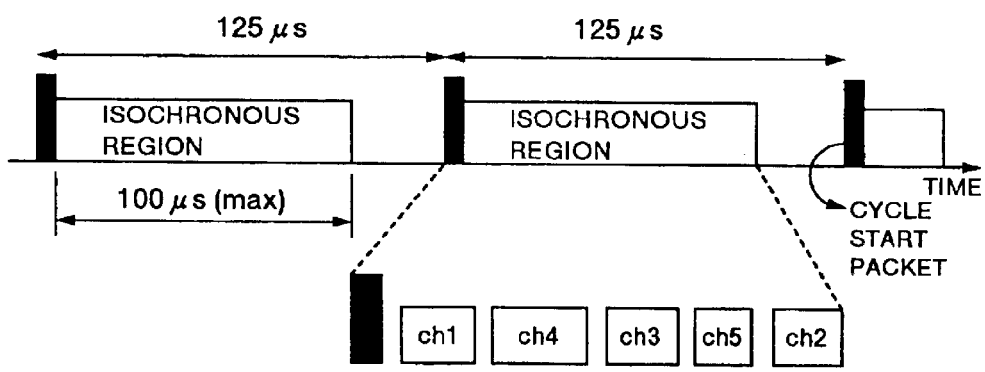
FIGS. 2A and 2B are diagrams showing a time-based transition state of a transfer using an IEEE standard 1394 interface, where
Figure 2B:
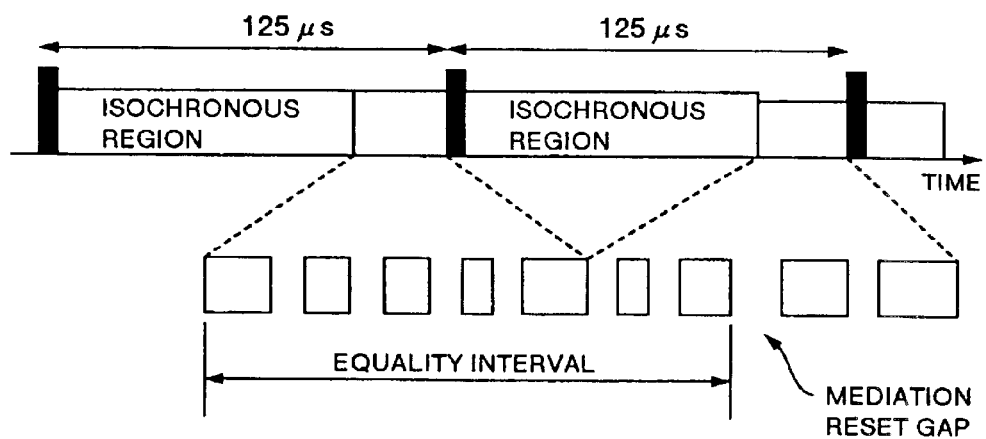

FIGS. 2A and 2B show a time-based transition state of a transfer according to the IEEE standard 1394 interface. FIG. 2A is a diagram showing an isochronous region in detail, and FIG. 2B is a diagram showing an asynchronous region in detail.

AS shown in FIG. 2A, in the isochronous transfer, data called a cycle start packet is generated for an isochronous cycle (125-μs period) in principle from any one of a plurality of nodes connected via a bus. The node wishing for the isochronous transfer transmits an isochronous request signal to an isochronous manager to secure the right to perform the isochronous transfer. Each node is assigned with a channel number (channels 1–5). The node acquired the right can assure the data transfer every isochronous cycle. In other words, in the isochronous transfer, the periodic data transfer can be surely made within the isochronous cycle. In this embodiment, this isochronous transfer mode is used to transfer the image data from the I/F portion 7 of the image scanner 1 to the computer 10.

As illustrated in FIG. 2B, in the asynchronous mode, the regions other than the isochronous regions are used as the asynchronous regions. In one equality interval, one node can transmit only once. When a node wishing for the transmission finishes the transmission, a mediation reset gap is generated. When the mediation reset gap is detected, the next equality interval comes, and again one node can transmit only once. The isochronous transfer allows a transmitter side to transmit data to a receiver side in one direction, while the asynchronous transfer allows the receiver received the data to transmit that effect back to the transmitter side. Therefore, although the data transfer with constant period cannot be assured, the re-transmission can be made when error is caused in the transfer, and thus the correct data transfer can be assured. In this embodiment, this asynchronous transfer mode is used for command data (control data), such as setting data and instruction data which do not need any periodic transfer and are transmitted and received between the I/F portion 7 and the computer 10. Thus, the isochronous transfer which has a limited transfer bandwidth can be utilized more effectively.

FIG. 3 is a timing chart of the image transfer in the image input apparatus shown in FIG. 1.

First, the setting data for the reading conditions is transferred from the computer 10 to the image scanner 1 in the asynchronous transfer mode. When the image scanner 1 receives this setting data and finishes setting the conditions of the units, it sends OK to the computer 10 in the asynchronous transfer mode. When the computer 10 receives this reply, it transmits a reading-start command to the image scanner 1 in the synchronous transfer mode. When the image scanner 1 receives this reading-start command, it sends OK to the computer 10 in the asynchronous transfer mode. Thus, the image scanner 1 secures the right to perform the isochronous transfer for the image data. In this embodiment, the I/F portion 7 functions as the mediation means for acquiring the right to perform the isochronous transfer.

As described above, the isochronous manager assigns the isochronous channel to the apparatus which transfers data in the isochronous transfer mode. In this embodiment, the computer 10 as the isochronous manager responds to the request from the I/F portion 7 to assign the isochronous channel to the image scanner 1, so that the image scanner 1 can acquire the right to perform the isochronous transfer.

After securing the right to perform the isochronous transfer, the image scanner 1 starts the reading of the manuscript images. The reason for this is that since the once started image reading process cannot be interrupted, the image reading process cannot be started until the image scanner acquires the right to perform the isochronous transfer. In addition, the I/F portion 7 transfers dummy data other than the image data to be transferred, to the computer 10 until the image data transfer is started after finishing the prepare of the manuscript-image reading. The computer 10 knows that no trouble such as the stop of operation occurs in the image scanner 1, by confirming that this dummy data has periodically transferred.

The image scanner 1 reads by the reader 4 each line of the manuscript image of the manuscript sheet carried by the carrier 3 or placed on a glass 11b which will be described later, converts the read image into a binary signal by the image processor 5, and stores the binary image in the memory 6. The memory 6 has a capacity capable of storing data for at least one line of the manuscript image. When the image data for one line has been written in the memory 6, the I/F portion 7 reads the image data for one line from the memory 6, and transfers it to the computer 10 in the isochronous transfer mode.

If it is now assumed that the resolution of the reader 4 is 300 dpi and that the maximum manuscript sheet size is A3, the amount of one-line data after the binary conversion is 440 bytes. Of course, if the read image data is not converted into the binary signal but produced in a form of a multilevel signal, the memory requires a larger capacity. Therefore, under this condition, the memory 6 needs the capacity of at least 440 bytes. Moreover, if the amount of data (packet) which is transferred once in the isochronous transfer mode is set as 440 bytes or more, the image data for one line can be transferred in one cycle.

The reading process for each line by the reader 4 is continuously performed with a constant reading-period. Since the image data transfer from the I/F portion 7 to the computer 10 is performed faster than the reading of the manuscript image by the reader 4, and since the periodic data transfer in the isochronous transfer mode cannot be assured, the memory 6 may have the capacity of at least one line. In addition, if there is no image data to be transferred until the next line is read after reading a certain line, the period in which no image data is transferred is effectively utilized so that a vacant packet as dummy data can be transferred to the computer 10 in that period. By this periodic transfer of the dummy data, the computer 10 can grasp that the image scanner 1 is not causing any trouble such as the stop of operation. Of course, the status information of the image scanner 1 (the presence or absence of the manuscript image sheet and the occurrence of jam) can be transferred in place of such dummy data. Thus, the more detailed situations in which the image scanner 1 is placed can be grasped without separately providing the process for transmitting and receiving the status information.

The image input apparatus according to the first embodiment of the present invention will be described in more detail with reference to an example of an actual image scanner.

Figure 4:
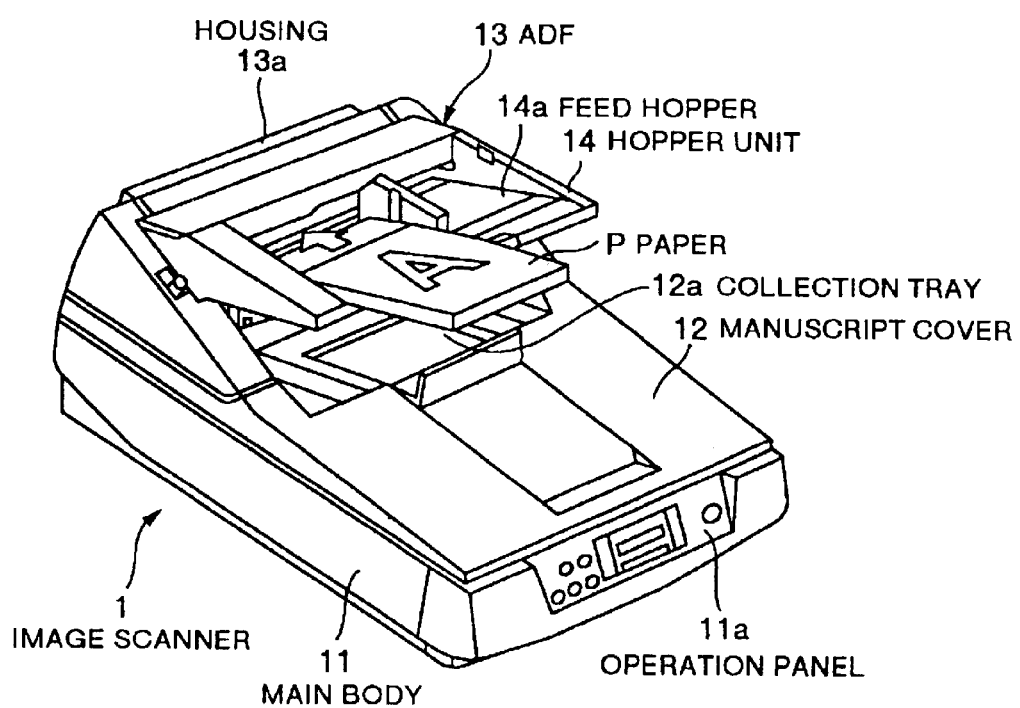
FIG. 4 is a schematic perspective view of an actual image scanner according to the first embodiment of the present invention.
Figure 5:
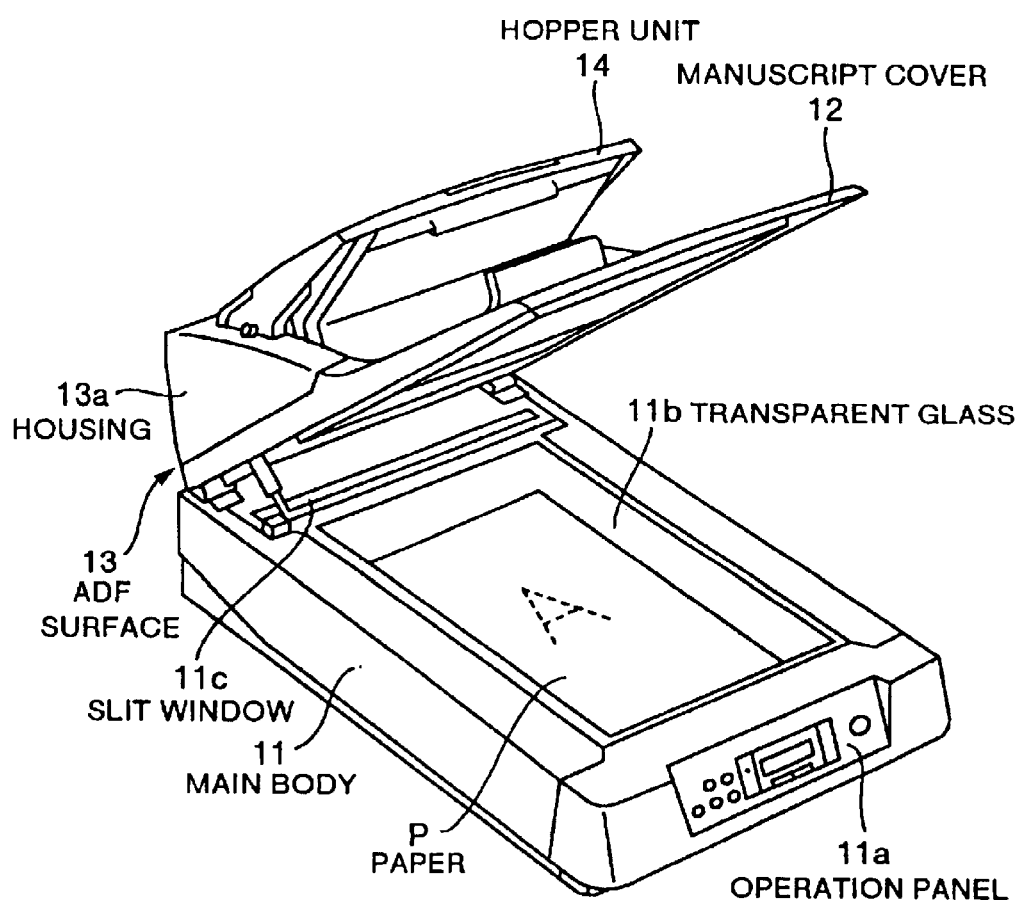
FIG. 5 is a schematic perspective view of the image scanner shown in FIG. 4, with its draft cover and automatic draft feeder opened.
Figure 6:
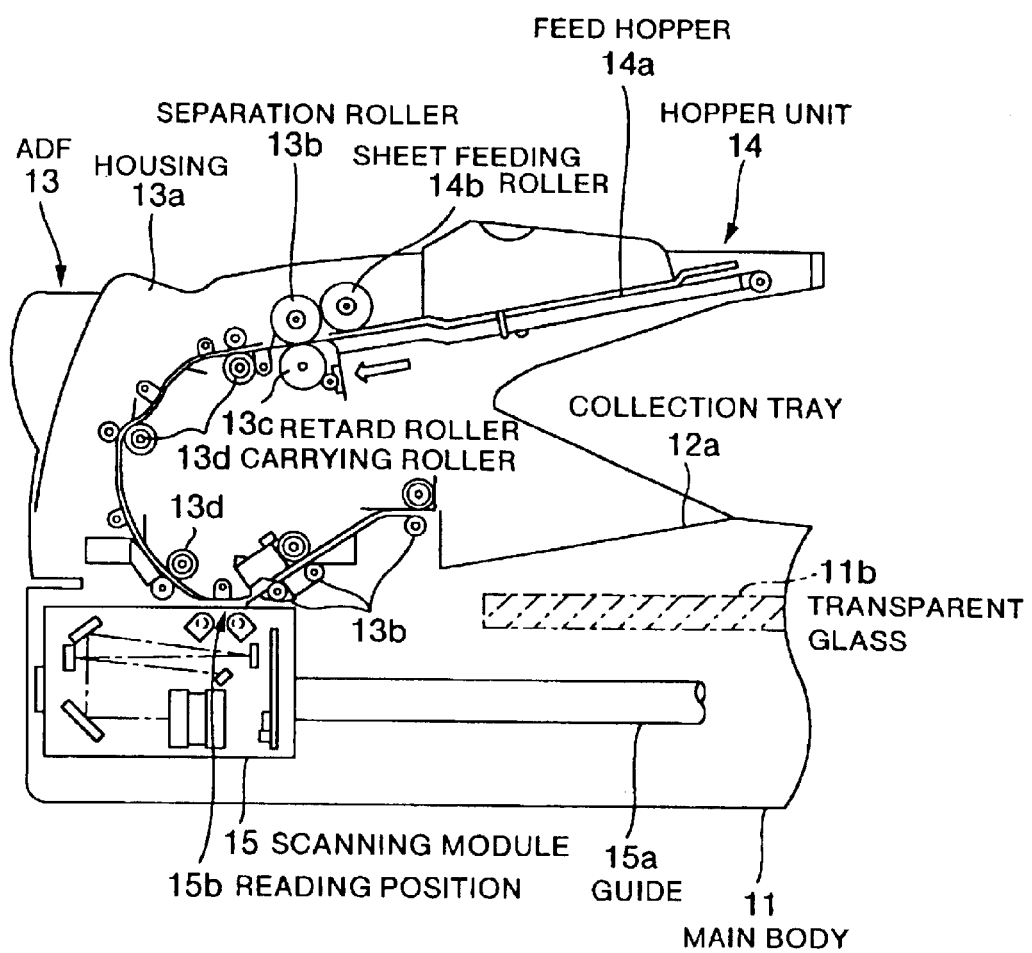
FIG. 6 is a schematic longitudinally cross-sectional view of a main part, showing the arrangement of the automatic draft feeder and scanning module.
Figure 7A:
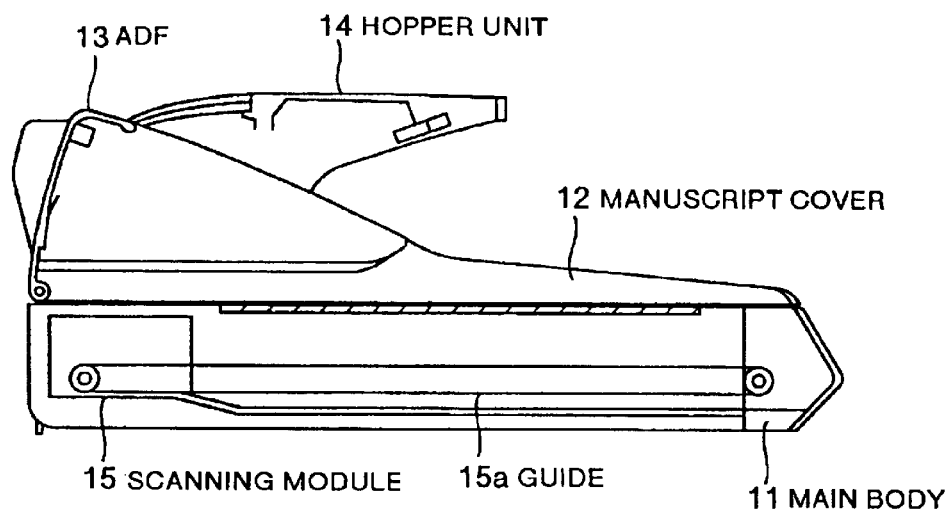
FIG. 7A is a schematic diagram showing the stop position of the scanning module in an automatic feeding mode.
Figure 7B:
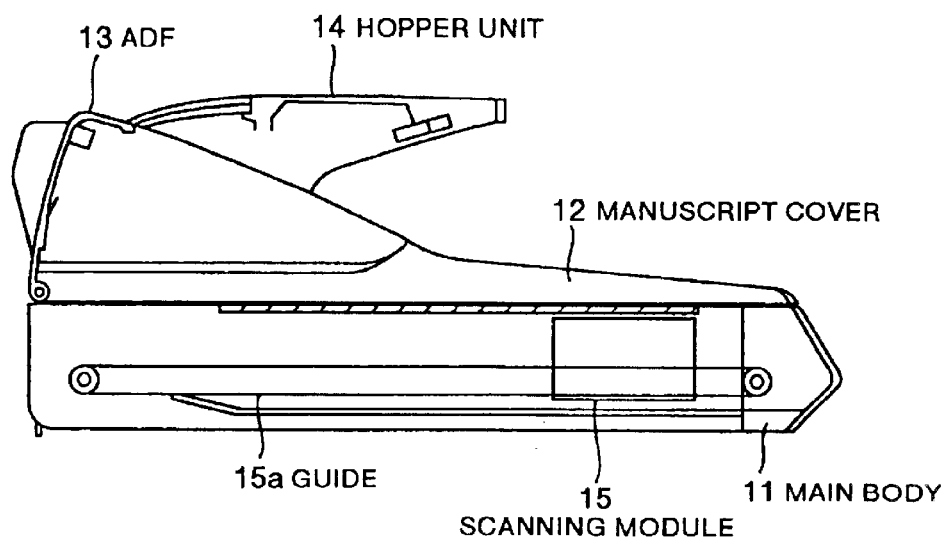
FIG. 7B is a schematic diagram showing the setting of the manuscript position of the scanning module in a manual feeding mode.

FIG. 4 is a schematic perspective view of an actual image scanner according to the first embodiment of the present invention. FIG. 5 is a schematic perspective view of the image scanner shown in FIG. 4 with a manuscript cover and automatic draft feeder opened. FIG. 6 is a schematic longitudinal cross-sectional view of a main part showing the arrangement of the automatic sheet feeder and scanning module. FIG. 7A is a schematic diagram showing the stop position of the scanning module in the automatic feeding mode. FIG. 7B is a schematic diagram showing the manuscript position of the scanning module in the manual feeding mode.

As shown in FIGS. 4 and 5, the image scanner 1 includes: a main body 11 in which an optical scanning module (which will be describe later) is incorporated; a manuscript cover 12 mounted on the top of the body 11 so that it can be opened or closed; and an automatic draft feeder (ADF) 13 for stacking sheets of manuscript image thereon and automatically supplying them one by one. The main body 11 includes an operation panel 11a provided on the front, and the CPU 2 (see FIG. 1) incorporated to control all the operating of the apparatus. On the top of the main body 11, there is provided a transparent glass plate 11b as a holder on which a sheet of manuscript image to be read is placed. On the inside of the main body 11, there is provided a transparent slit-shaped glass window 11c. The transparent glass 11b is provided to occupy all region of the top except the inner side (opposite to the operation panel 11a) of the main body 11. The root ends of the manuscript cover 12 and ADF 13 are mounted on the inner side of the main body 11 so that they can be opened and closed. The manuscript cover 12 and ADF 13 can be opened together as a unitary body as shown in FIG. 5. Thus, when the manuscript cover 12 is opened, a sheet of manuscript image can be placed by hand on the transparent glass 11b. On the top of the manuscript cover 12, there is provided a collection tray 12a which receives the read sheet sent from the ADF 13.

The ADF 13 includes a housing 13a, and a hopper unit 14 provided on the upper end of the housing 13a. The hopper unit 14 includes a feed hopper 14a for stacking sheets P of manuscript image thereon as shown in FIG. 4. The hopper unit 14 also includes a feed roller 14b provided above the sheet send-out end (the left end in FIG. 6) of the feed hopper 14a in order to pick up the sheet P and send out it as shown in FIG. 5. The housing 13a includes a pair of a separation roller 13b and retard roller 13c provided downstream just after the feed roller 14b, in order to prevent stuck sheets from being sent out. Moreover, a carrying path is provided to extend from around the top of the main body 11 to the inside, turning back to the collection tray 12a of the manuscript cover 12. A plurality of carrying rollers 13d are provided along this carrying path. The ADF 13 and the hopper unit 14 constitute the carrier 3 shown in FIG. 1.

On the inside of the main body 11, there is provided a scanning module 15 for reading the images on 2D the sheets as shown in FIG. 6. The scanning module 15 has provided therein a reduced optical image reading system using a CCD, and moves along a guide 15a provided to extend from around the operation panel 11a on the front of the main body 11 to around the back of the main body 11. This scanning module 15 constitutes the reader 4 shown in FIG. 1.

In the automatic feeding mode in which the ADF 13 is operated, the scanning module 15 rests at the left end of the main body 11 as shown in FIG. 7A. In this automatic feeding mode, the scanning module 15 reads the image on the sheet P at the reading position 15b (see FIG. 6) when the sheet P supplied from the feed hopper 14a passes along the carrying path. A manuscript sensor (not shown) for detecting the fore end of the manuscript sheet is provided just before the reading position 15b.

When the scanning module 15 reads the image on the sheet placed on the transparent glass 11b, it is moved to around the extreme forward end, as shown in FIG. 7B, of the transparent glass 11b from the position shown in FIG. 7A. Then, the scanning module 15 moves from the position shown in FIG. 7B as the origin to the left side in order to scan the sheet, thereby reading the image.

Figure 8:
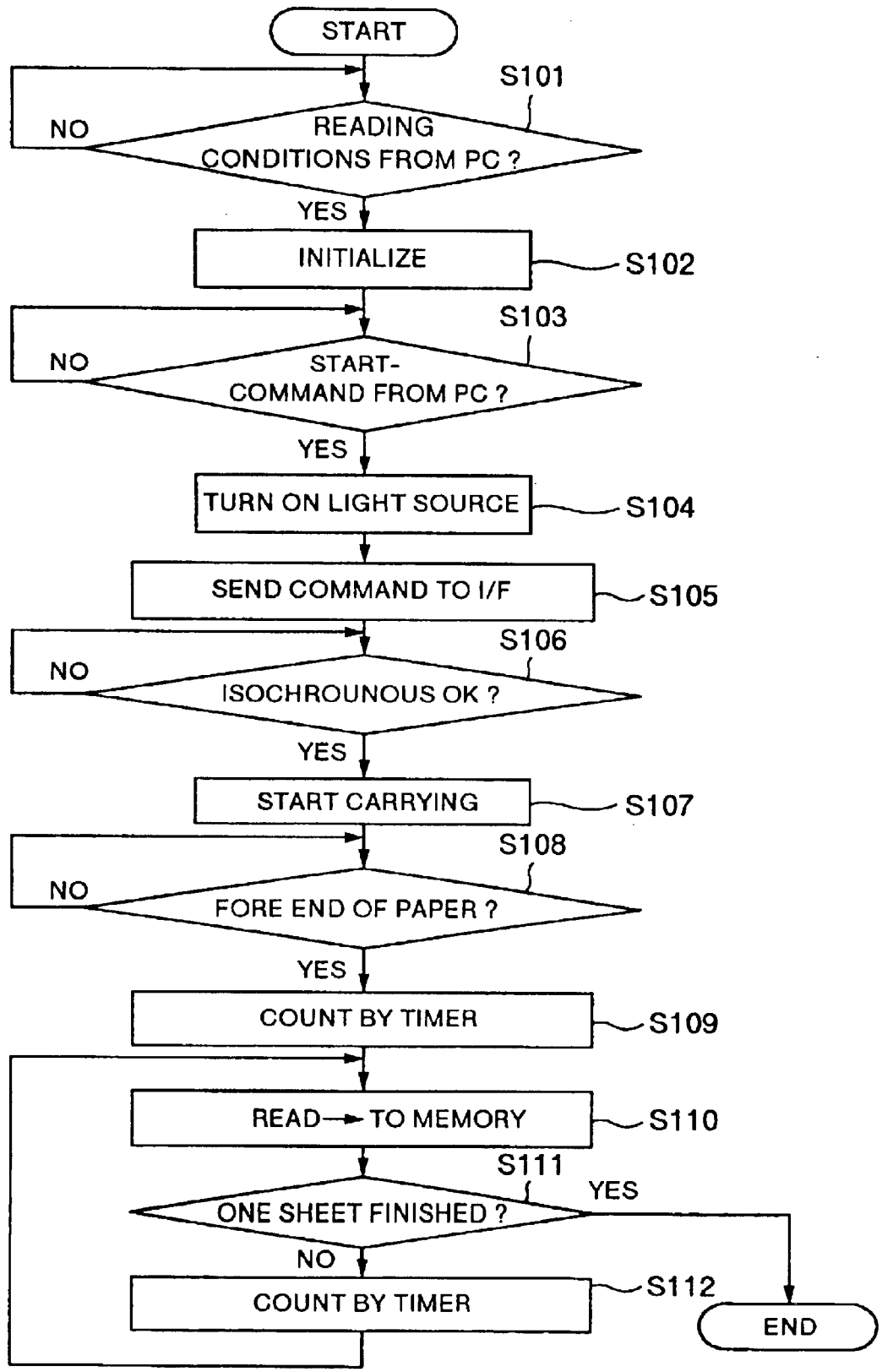
FIG. 8 is a flowchart showing a reading process in the automatic feeding mode.
Figure 9:
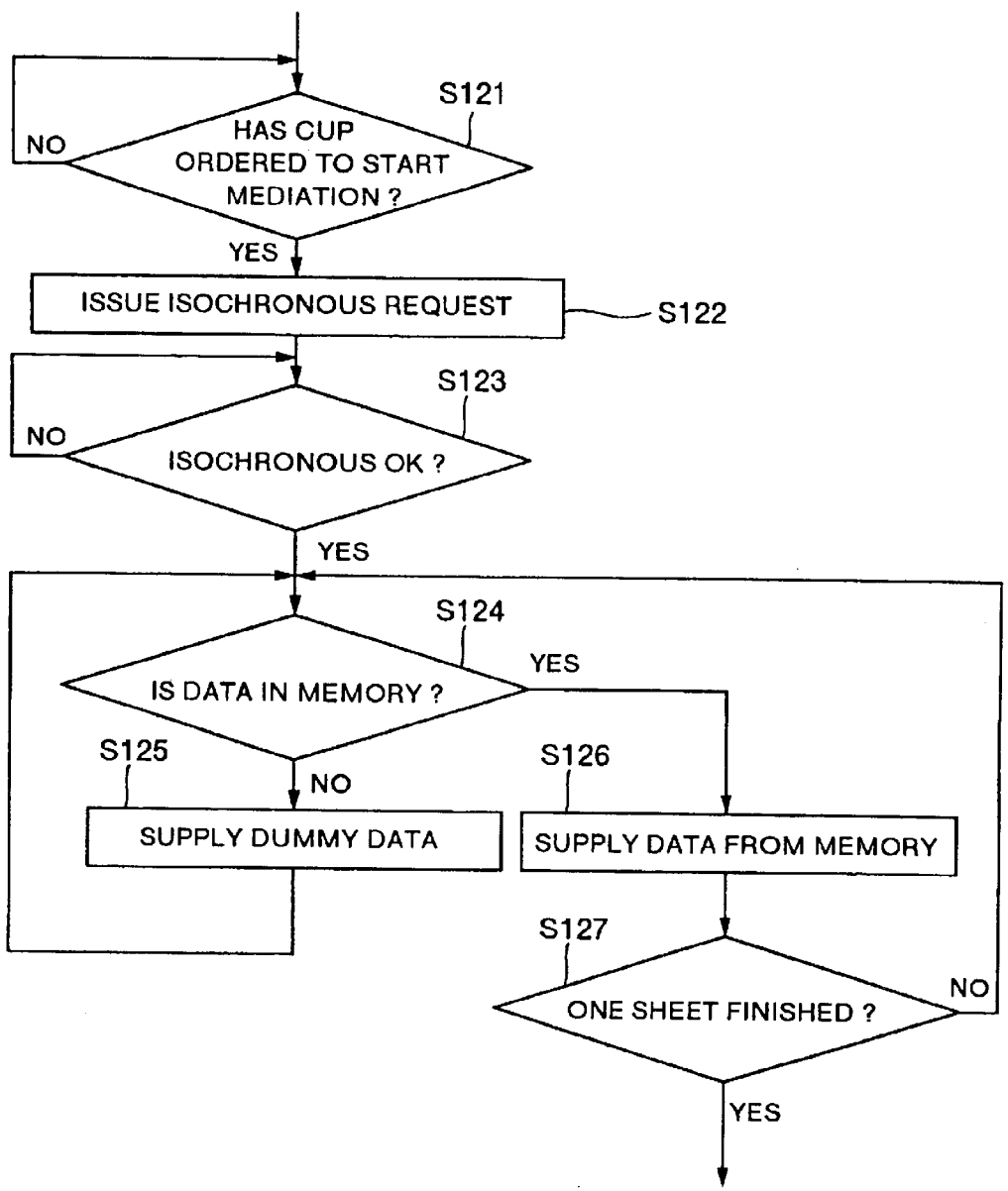
FIG. 9 is a flowchart showing a process in an I/F portion.
Figure 10:
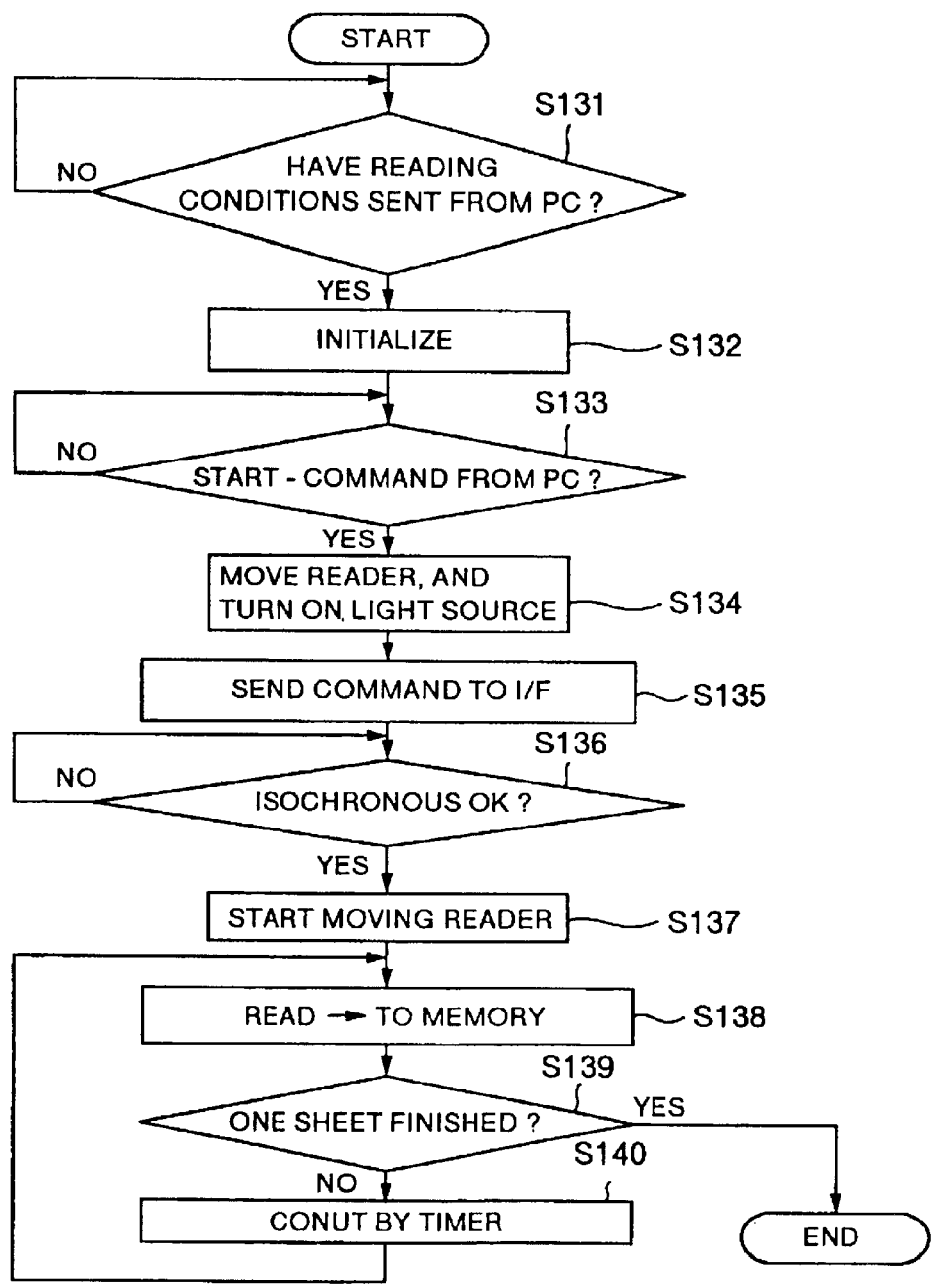
FIG. 10 is a flowchart showing a reading process in an FB.
Figure 11:
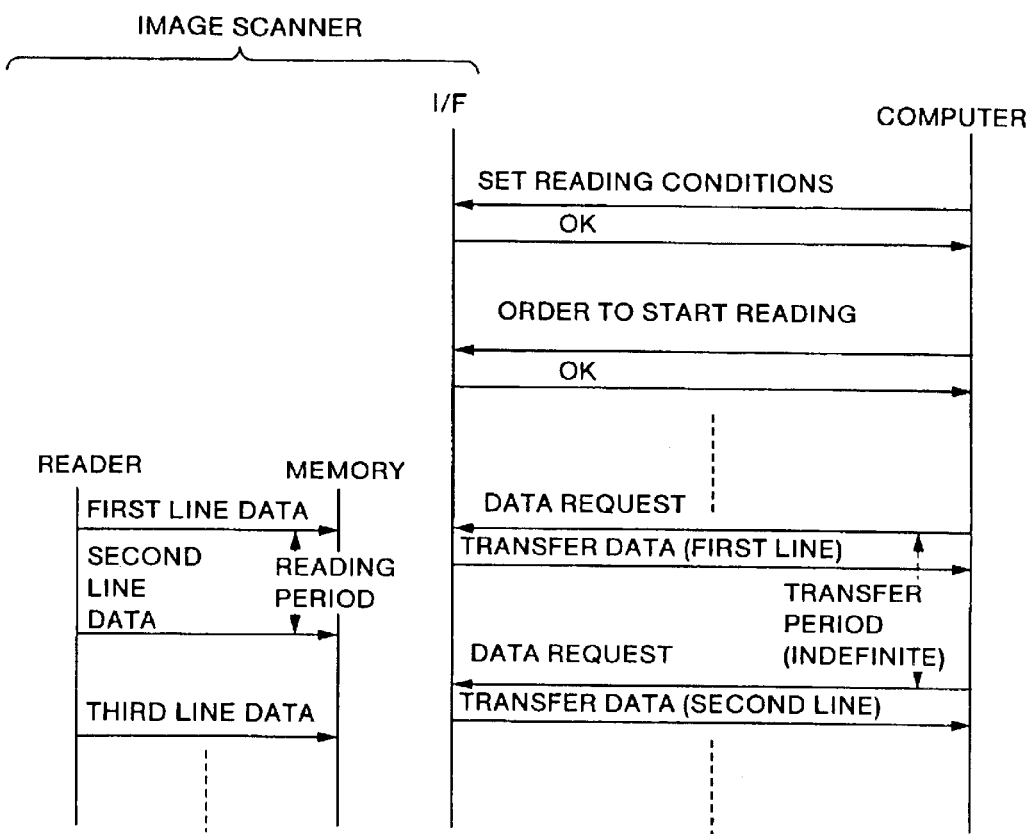
FIG. 11 is a timing chart of an image transfer in an image scanner using a conventional communication system.

The reading operation in this image scanner will be described for the case using the ADF 13 (for ADF) and for the case using the transparent glass 11b (for FB) with reference to the flowcharts of FIGS. 8–10. FIG. 8 is a flowchart showing the ADF reading process, FIG. 9 is a flowchart showing the process in the I/F portion 7, and FIG. 10 is a flowchart showing the FB reading process.

In the reading process for ADF, as shown in FIG. 8, the setting data for the reading conditions is first transferred from the computer 10 to the image scanner 1 in the asynchronous transfer mode (S101). The CPU 2 uses this transferred setting data to initialize the image scanner 1 (S102). At this time, the CPU 2 also confirms whether or not there is a sheet of manuscript image on the feed hopper 14a.

Then, the CPU 2 waits for the computer 10 to send the reading-start command (S103). When the reading-start command is transferred from the computer 10 to the CPU 2 in the asynchronous transfer mode and received by the CPU 2, the light source of the reader 4 is turned on (S104). The CPU 2 issues to the I/F portion 7 a command to acquire the right to perform the isochronous transfer of image data (S105). The CPU 2 waits for the right to be acquired (S106), and then orders the carrier 3 to start carrying a manuscript sheet (S107).

The CPU 2 waits for the manuscript sheet to be carried from the hopper unit 14 and arrive at the manuscript sensor just before the reading position 15b (S108). The CPU 2, when the fore end of the manuscript sheet is detected by the manuscript sensor, counts a constant time by a timer and causes the manuscript sheet to be further carried until the fore end of the manuscript sheet reaches the reading position 15b (S109). Then, the reader 4 reads one line of image on the manuscript sheet, and supplies it through the image processor 5 to the memory 6 where it is stored (S110). After one line has been read, followed by counting a certain time (S112), the next line is read (S110). The processes from step S110 to step S112 are repeated to read all the images on the manuscript sheet (S111).

At this time, the I/F portion 7 performs the process shown in FIG. 9.

When receiving from the CPU 2 (S121) a command which orders the I/F portion 7 to acquire the right to perform the isochronous transfer, the I/F portion 7 sends the isochronous request to the computer 10 (S122), and waits until the channel is assigned and the right to perform the isochronous transfer can be acquired (S123). The I/F portion 7, when this right has been acquired, checks if the read one-line image data is stored in the memory 6 (S124). If there is no image data in the memory 6, the I/F portion 7 transmits dummy data to the computer 10 in the isochronous transfer mode (S125). If there is image data in the memory 6, the I/F portion 7 transfers the image data in the isochronous transfer mode (S126), and the operations in steps S124–S126 are repeated until all the images on one manuscript sheet has been completely transferred (S127).

Therefore, in the ADF reading process, although the time when any one of manuscript sheets starts to be read is uncertain, the image data, just after being started to read, can be surely periodically transferred to the computer 10, or transferred to the computer 10 without delay. In the ADF reading process, it is very difficult to interrupt the automatic feeding of the manuscript sheets one by one. However, the image scanner 1 according to this embodiment can transfer the image data to the computer 10 using the small-capacity memory of one line without interrupting the supply of manuscript sheets.

In the FB reading process, as shown in FIG. 10, the setting data for the reading conditions is first transferred from the computer 10 to the image scanner 1 in the asynchronous transfer mode (S131). The CPU 2 uses this transferred setting data to initialize the image scanner 1 (S132).

Then, the CPU 2 waits for the computer 10 to issue the reading-start command (S133). If the CPU 2 receives the reading-start command transferred from the computer 10 in the asynchronous transfer mode, the CPU 2 orders the scanning module 15 to move to the position shown in FIG. 7B, and then causes the light source of the reader 4 to turn on (S134). The CPU 2 issues to the I/F portion 7 a command to secure the right to perform the isochronous transfer of image data (S136). The CPU 2 waits for the I/F portion 7 to acquire the right to perform the isochronous transfer (S136), and then orders the scanning module 15 to move in the sub-scanning direction (S137).

Thereafter, the scanning module 15 reads one line of the image on the manuscript sheet, and supplies it through the image processor 5 to the memory 6 where it is stored (S138). After the one-line image is read, a predetermined time is counted by a timer (S140), and then the image of the next line is read (S138). The operations in steps S138–S140 are repeated, reading all the images on the manuscript sheet (S139). In the FB reading process, a positional shift occurs when the scanning module 15 is halfway stopped from being moved. However, the image scanner 1 of this embodiment can transfer the image data using the small-capacity memory of one line to the computer 10 without interrupting the movement of the scanning module 15.

In the image input apparatus according to this embodiment, the dummy data may be empty data, the status information of the image scanner 1 or one-line image data transferred immediately before. Thus, by re-transmitting the just preceding image data, it is possible to check if the transferred data has error.

The IEEE standard 1394 interface in the image input apparatus according to this embodiment can be replaced by other interface such as USB having a transfer mode equivalent to the above mentioned isochronous transfer mode and asynchronous transfer mode.

(Second Embodiment)

The hardware structure of an image input apparatus according to a second embodiment of the present invention is the same as that of the image input apparatus according to the first embodiment shown in FIG. 1 except that the carrier 3 functions as supply means for successively supplying, carrying and discharging a plurality of manuscript sheets one by one. Therefore, the structure will not be described in detail.

Figure 12:
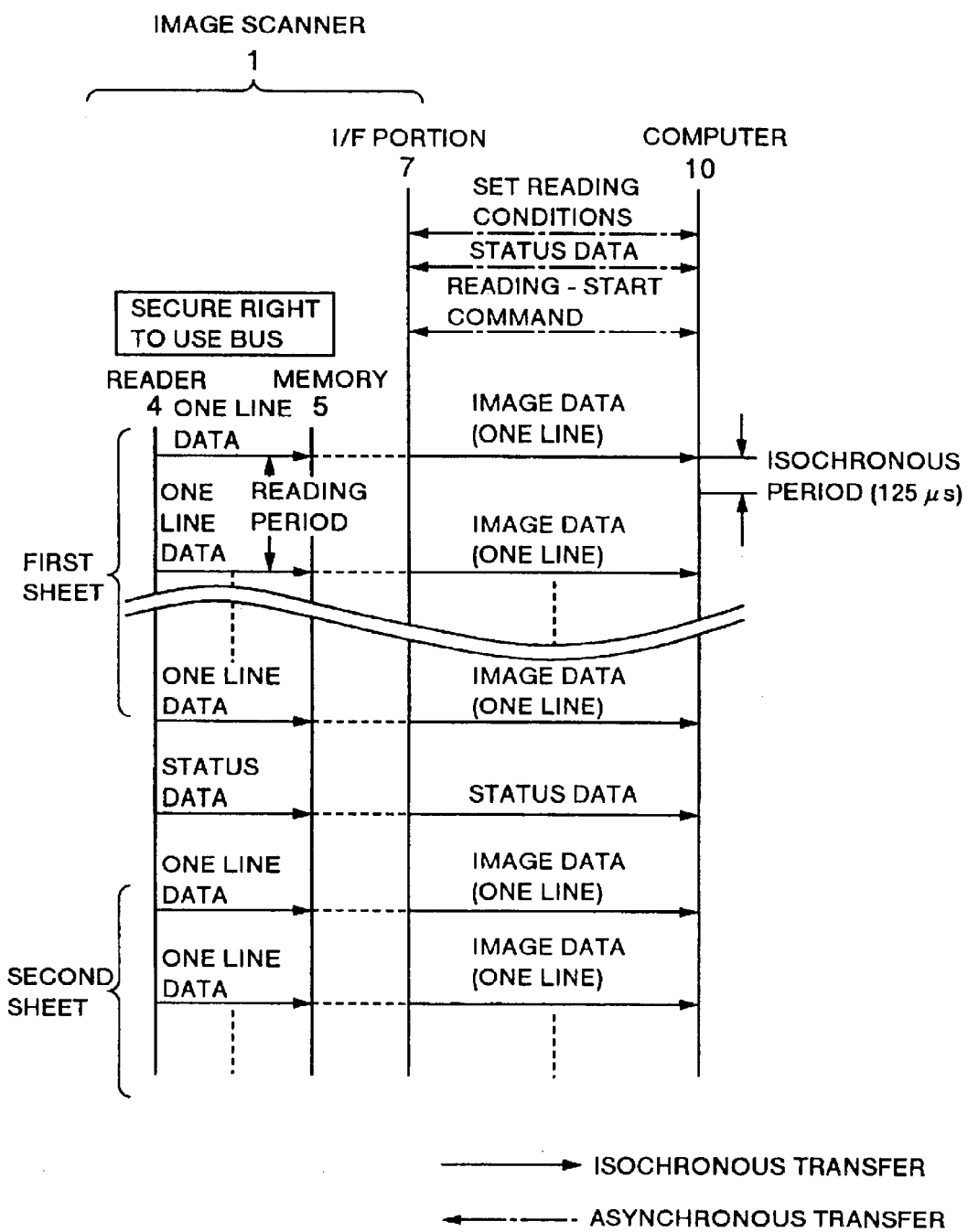
FIG. 12 is a timing chart of an image transfer in an image input apparatus according to a second embodiment of the present invention.

The image transfer in the image input apparatus according to the second embodiment will be described with reference to FIG. 12.

First, the setting data for the reading conditions is transferred from the computer 10 to the image scanner 1 in the asynchronous transfer mode. The image scanner 1, when receiving this setting data and finishing the setting of the apparatus, sends OK to the computer 10 in the asynchronous transfer mode. At this time, the image scanner 1 detects the presence or absence of a manuscript sheet to be fed to the carrier 3, and transfers the detected result as the status data indicating the status of the image input apparatus to the computer 10 in the asynchronous transfer mode.

When confirming that there is a manuscript sheet from this status data, the computer 10 sends the reading-start command to the image scanner 1 in the asynchronous transfer mode. The image scanner 1, when receiving this reading-start command, sends OK to the computer 10 in the asynchronous transfer mode. Then, the image scanner 1 acquires the right to perform the isochronous transfer for the image data. In this embodiment, the I/F portion 7 functions as mediation means for securing the right to perform the isochronous transfer.

As described above, the isochronous manager assigns an isochronous channel to the apparatus which performs the data transfer in the isochronous transfer mode. In this embodiment, the computer 10 as the isochronous manager responds to the request from the I/F portion 7 to assign the isochronous channel to the image scanner 1, so that the image scanner 1 can acquire the right to perform the isochronous transfer. After acquiring the right to perform the isochronous transfer, the image scanner 1 starts reading the manuscript image. The reason for this is that since the once started image reading process cannot be halfway stopped, the image reading process cannot be started until the right to perform the isochronous transfer is acquired.

In the image scanner 1, the carrier 3 carries the first manuscript sheet, the reader 4 reads one line of the image on the sheet, the image processor 5 converts the read image into a binary value, and the memory 6 stores the binary image. The memory 6 has a capacity capable of storing at least one line of the image on the sheet. When the one-line image data is stored in the memory 6, the I/F portion 7 reads the one-line image data from the memory 6, and transfers it to the computer 10 in the isochronous transfer mode.

If it is now assumed that the resolution of the reader 4 is 300 dpi and that the maximum manuscript size is A3, the amount of the one-line data after conversion into the binary value is 440 bytes. Of course, if the read image data is not converted into the binary value but directly produced in a multilevel, a larger capacity is necessary. Therefore, under these conditions, the memory 6 needs the capacity of at least 440 bytes. Moreover, if the amount of data (1 packet) to be once transferred in the isochronous transfer mode is 440 bytes or more, the one-line image data can be transferred in one cycle.

The reading process in which the reader 4 reads each line is repeatedly and successively performed with a constant period until the first sheet of manuscript image has been completely read. Since the I/F portion 7 transfers the image data to the computer 10 faster than the reader 4 reads the manuscript image, and since the periodic data transfer is surely performed in the isochronous transfer mode, the memory 6 may have the capacity of at least one line.

After finishing the reading of the first manuscript sheet, the I/F portion 7 transfers the status data indicating the status of the image input apparatus, to the computer 10 in the isochronous transfer mode at the next isochronous cycle. The computer 10 knows from the received status data that the first manuscript sheet has been completely read. The transferred status data contains the state in which the light source of the reader 4 is turned on or off, the presence or absence of any manuscript sheet in the carrier holds 3, the presence or absence of paper clogging, and other circuit conditions.

The computer 10 can perform the next process on the basis of these received status data. Particularly, from the status data indicating the presence or absence of the next manuscript sheet to be carried by the carrier 3 (here, since there is the second manuscript sheet, "the sheet is present"), the computer 10 can know that the image data of the next sheet is successively being transferred. In other words, from only this status data, the computer 10 can know both that the first sheet has been read, and that the next image data is being transferred or not. As a result, the successive image data can be effectively processed.

The second sheet is successively read by the reader 4, and then the same steps are repeated as in the process for the first sheet.

In this way, the status data is squeezed into the isochronous transfers of the image data of a plurality of sheets and transferred in the isochronous transfer mode, so that the image data and status data can be surely transferred without delay. The other apparatus can know from the transmission of this status data the interval between the image data of one sheet and the image data of the next page. As a result, the image data of the next sheet can be successively transferred on the basis of this status data.

In other words, the image data and status data are successively transferred in the isochronous transfer mode in which the periodic data transfer can be assured. Thereby, the image data of a plurality of sheets can be periodically transferred without waiting for the right to use the bus to be acquired until the image data of the next manuscript sheet starts to be processed. Accordingly, it is possible to increase the image input processing speed. Further, the image data does not stay in the image input apparatus, so that it is possible to make the capacity of the memory for storing the image data as small as possible.

Figure 13:
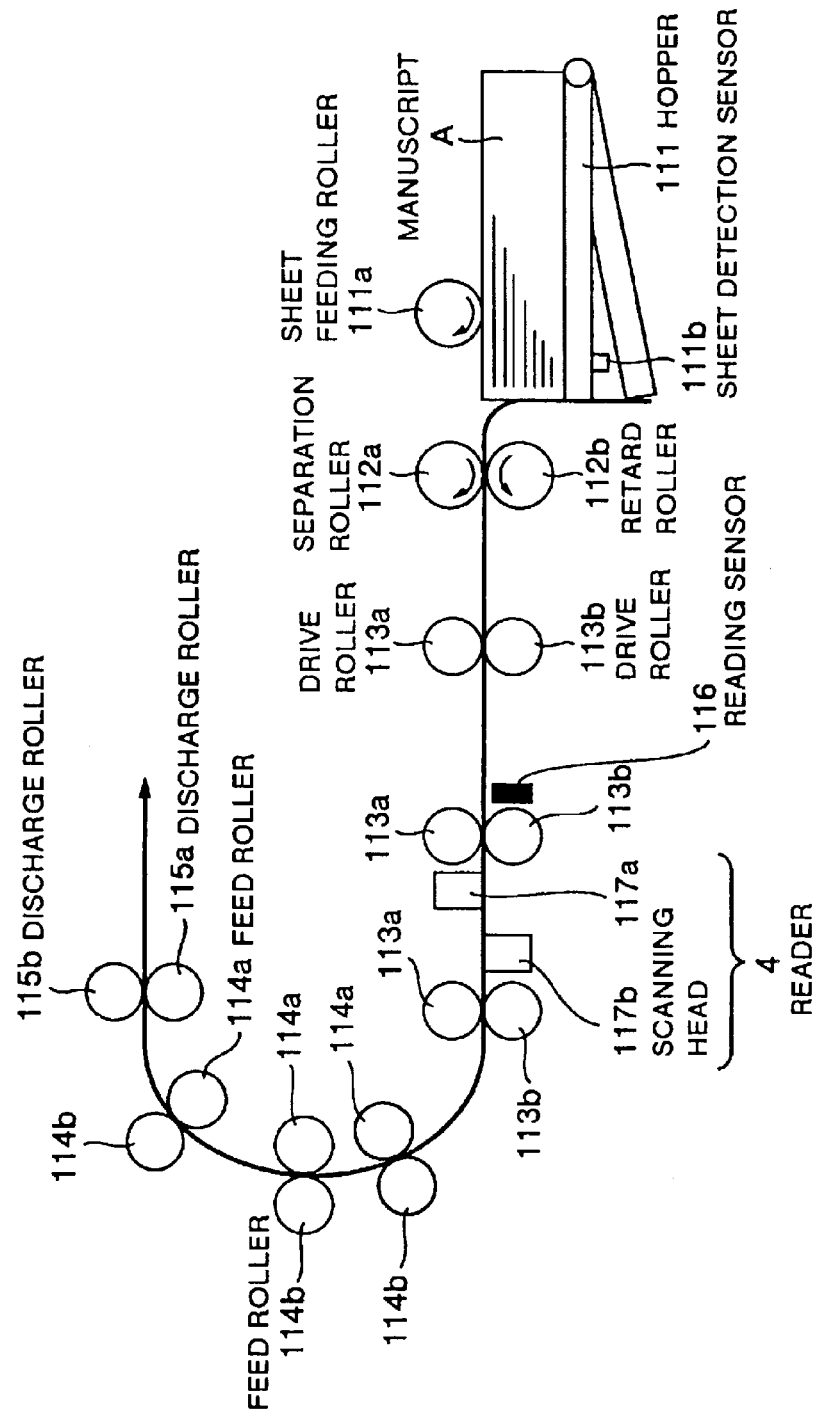
FIG. 13 is a schematic diagram of a main part of an actual image scanner according to the second embodiment of the present invention.

The actual image scanner 1 will be described in detail with reference to FIG. 13. FIG. 13 is a schematic diagram of a main part of the image scanner 1 according to the second embodiment.

Referring to FIG. 13, a feed roller 111a is provided above a hopper 111 holding the stacked sheets of manuscript "A", and a separation roller 112a and a retard roller 112b are provided downstream to oppose up and down relative to the carrying path. The hopper 111 is, as well known, elastically urged to rotate clockwise around its right end as a fulcrum by a spring (not shown) so that the top one of the stacked manuscript sheets "A" can be pushed by the hopper 111 against the sheet feeding roller 111a and thus can be sent out by the rotation of the sheet feeding roller 111a. The hopper 111 includes a sheet detection sensor 111b for detecting the presence or absence of any one of the manuscript sheets "A". Only when any one or ones of the sheets "A" are detected, the sheets can be supplied. The separation roller 112a and retard roller 112b may be the same as ones in the prior art. A torque limiter incorporated in the retard roller 112b can act to prevent the overlapped sheets "A" from being sent out from the hopper 111.

On the downstream side of the separation roller 112a and retard roller 112b, there are provided three pairs of drive rollers 113a and 113b each in series along the carrying path in order to carry the sheet "A" sent out from the hopper 111. On the downstream side of the pairs of drive rollers 113a and 113b, there are also provided three pairs of feed rollers 114a and 114b each along the discharge path which is curved up in an arc shape in the carrying direction. In addition, discharge rollers 115a and 115b are provided on the downstream end.

The carrier 3 shown in FIG. 1 is constituted by the hopper 111, the sheet feeding roller 111a, the separation roller 112a, the retard roller 112b, the drive rollers 113a, 113b, the feed rollers 114a, 114b, and the discharge rollers 115a, 115b.

A read sensor 113a for detecting the fore end of the sheet "A" and supplying the detection time to a controller is provided just before the second pair of drive rollers 113a and 113b. In addition, the reader 4 for reading the image on the sheet "A" is provided between the second pair of drive rollers 113a and 113b and the third pair of drive rollers 113a and 113b. The reader 4, as illustrated, has optical scanning heads 117a and 117b disposed on and under the carrying path in order to read both the front and rear sides of the sheet "A".

Figure 14:
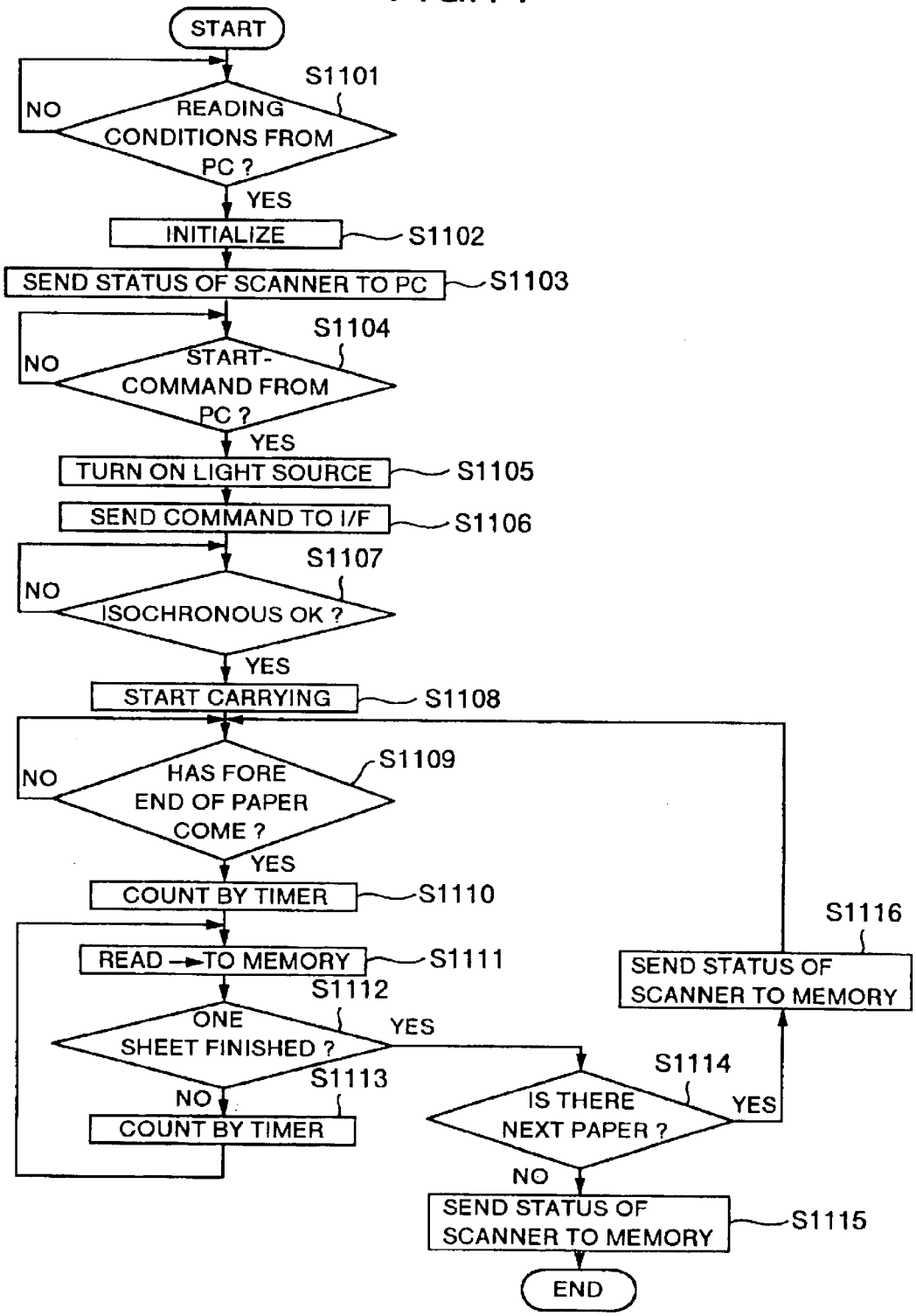
FIG. 14 is a flowchart showing a reading process in the image scanner shown in FIG. 13.
Figure 15:
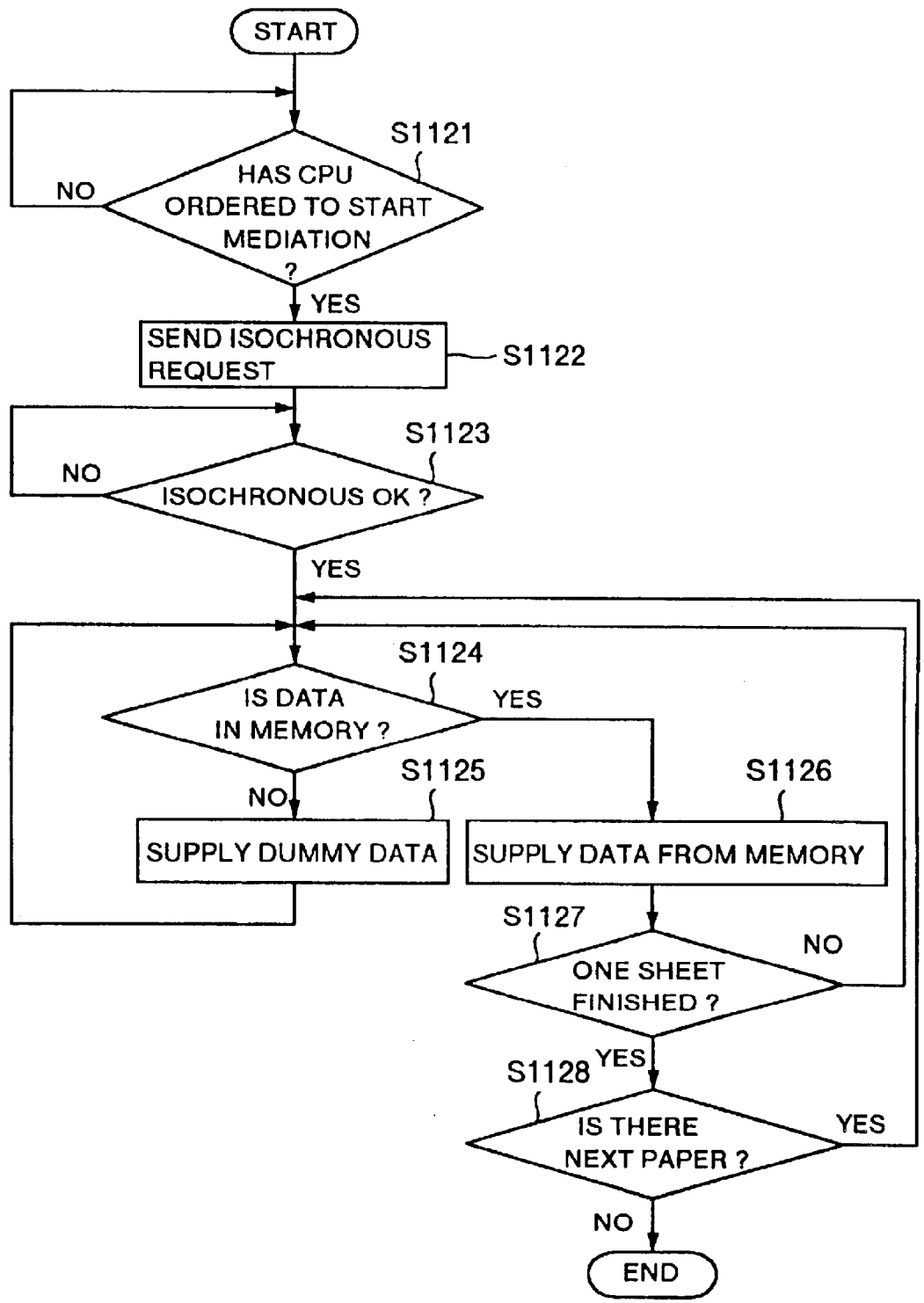
FIG. 15 is a flowchart showing a process in an I/F portion of the image input apparatus according to the second embodiment of the present invention.

The operation of the image scanner having the above structure will be described with reference to the flowcharts of FIGS. 14 and 15. FIG. 14 is a flowchart showing the reading process in the image scanner 1, and FIG. 15 is a flowchart showing the process in the I/F portion 7.

As shown in FIG. 14, the setting data for the reading conditions is first transferred from the computer 10 to the image scanner 1 in the asynchronous transfer mode (S1101). The CPU 2 uses this transferred setting data to initialize the image scanner 1 (S1102). At this time, the manuscript detection sensor 111b detects the presence or absence of any manuscript sheet on the hopper 111, and transfers the detected result as the status data to the computer 10 in the asynchronous transfer mode (S1103).

Then, the CPU 2 waits for the computer 10 to issue the reading-start command (S1104). The reading-start command is transferred from the computer 10 to the CPU 2 in the asynchronous transfer mode. The CPU 2, when receiving this command, causes the light source of the reader 4 to be turned on (S1105). The CPU 2 orders the I/F portion 7 to acquire the right to perform the isochronous transfer of image data (S1106). The CPU 2 waits until the right to perform the isochronous transfer is acquired (S1107), and then orders the carrier 3 to start carrying the sheet (S1108).

The CPU 2 waits until the sheet is carried from the hopper 111 and arrives at the read sensor 116 (S1109). After the fore end of the sheet is detected by the read sensor 116, a certain time is counted by a timer, and the sheet is further carried until the fore end of the sheet arrives at the reader 4 (S1110). Then, the CPU 2 causes the reader 4 to read one line of the image on the sheet, and supply it through the image processor 5 to the memory 6 where it is stored (S1111). The CPU 2, after letting one line be read, orders the timer to count a predetermined time (S1113) and the reader to read the next line (S1111). The operations in steps S1111–S1113 are repeated to completely read one sheet of manuscript image. The end of reading one manuscript sheet can be known by detecting the back end of the sheet by the read sensor 116 and counting a constant time by the timer (S1112).

After finishing the reading of one sheet, the manuscript detection sensor 111*b* detects the presence or absence of the next sheet on the hopper 111 (S1114). If there is no sheet, the fact that any sheet is absent on the hopper 111 is stored as the status data in the memory 6 (S1115), and the processing ends. If there is the next sheet, the fact that a sheet is present on the hopper 111 is stored as the status data in the memory 6 (S1116), and the next sheet is successively read (s1109).

On the other hand, the I/F portion 7 performs the process shown in FIG. 15.

When the CPU 2 orders the I/F portion 7 to acquire the right to perform the isochronous transfer (S1121), the I/F portion 7 issues an isochronous request to the computer 10 (S1122), and waits until a channel is assigned so that the right to perform the isochronous transfer can be secured (S1123). When this right is acquired, the I/F portion 7 checks if the memory 6 has stored therein the read one-line image data or status data (S1124). If no image data or status data is stored in the memory 6, the I/F portion 7 transfers dummy data to the computer 10 in the isochronous transfer mode (S1125). If the image data is stored in the memory 6, the I/F portion 7 causes the image data to be transferred (S1126), and this operation is repeated until all image data on one sheet have been completely transferred (S1127). If the next sheet is present after the end of all image transfers, the isochronous transfer mode is maintained. If there is no sheet, the processing ends (S1128).

According to this image scanner 1, the image data can be surely and periodically transferred to the computer 10 immediately after the start of reading, or transferred to the computer 10 without delay. In addition, after the image data of one sheet of a plurality of sheets has been transferred in the isochronous transfer mode, the status data is transferred in the same isochronous transfer mode. That is, the status data is transferred in the isochronous transfer mode in such a manner that it is repeatedly inserted between the isochronous transfers of the image data of a plurality of sheets. Thus, the image data and status data can be surely transferred without delay.

In other words, after one-sheet image data has been transferred, the status data are continuously transferred in the isochronous transfer mode in which the periodic data transfer can be assured. Thereby, it is possible to transfer the status data by the time when the image data on the next sheet starts to be processed, without the need to wait until the right to use the bus for the transfer can be secured. The image data of a plurality of sheets can be periodically transferred without being interrupted at each of the successively fed sheets. Consequently, since the image input processing speed can be increased and no image data stays in the image input apparatus, the capacity of the memory for storing the image data can be minimized to be as small as possible.

Moreover, the IEEE standard 1394 interface in this embodiment can be replaced by another interface such as USB which has the transfer mode equivalent to the above-mentioned isochronous or asynchronous transfer mode.

(Third Embodiment)

The hardware structure of an image input apparatus according to a third embodiment of the present invention is the same as that of the image input apparatus according to the first embodiment shown in FIG. 1, and will not be described in detail.

Figure 16:
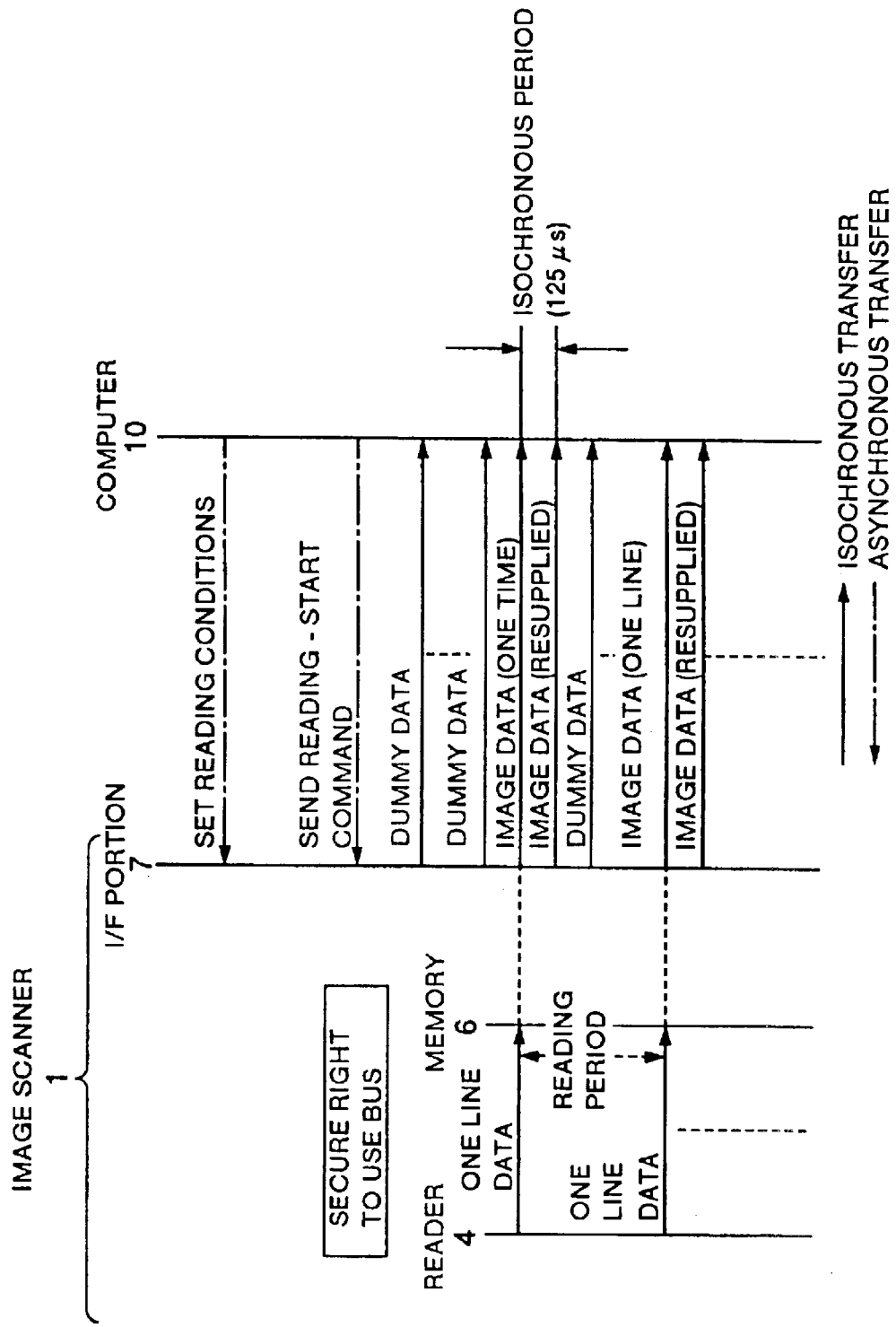
FIG. 16 is a timing chart of an image transfer in an image input apparatus according to a third embodiment of the present invention.

The image transfer in the image input apparatus according to the third embodiment will be described with reference to FIG. 16.

First, the setting data for the reading conditions is transferred from the computer 10 to the image scanner 1 in the asynchronous transfer mode. When receiving this setting data and finishing to set the apparatus, the image scanner 1 sends OK to the computer 10 in the asynchronous transfer mode. The computer 10 receives this reply, and issues the reading-start command to the image scanner 1 in the asynchronous transfer mode. The image scanner 1, when receiving the reading-start command, sends OK to the computer 10 in the asynchronous transfer mode. Then, the image scanner 1 acquires the right to perform the isochronous transfer in order to transfer the image data. In this embodiment, the I/F portion 7 functions as mediation means for securing the right to perform the isochronous transfer.

As described above, the isochronous manager assigns an isochronous channel to the apparatus for performing the data transfer in the isochronous transfer mode. In this embodiment, the computer 10 as the isochronous manager responds to the request from the I/F portion 7 to assign the isochronous channel to the image scanner 1, and thus the image scanner 1 acquires the right to perform the isochronous transfer.

When acquiring the right to perform the isochronous transfer, the image scanner 1 starts reading an image of a manuscript sheet. The reason for this is that since the once started image reading process cannot be interrupted, the image scanner 1 cannot start the image reading process until the right to perform the isochronous transfer is acquired. Moreover, the I/F portion 7 transfers dummy data other than the image data to be transferred, to the computer 10 in the period from when the manuscript image is ready to be read to when the image data starts to be transferred. The computer 10 can know by confirming the periodic transfer of the dummy data that no trouble such as the stop of operation occurs in the image scanner 1.

The image scanner 1 orders the reader 4 to read one line, as a unit, of the image on the manuscript sheet carried by the carrier 3 or the manuscript sheet placed on the transparent glass 11*b*, the image processor 5 to convert the read image into a binary value, and the memory 6 to store the binary image. The memory 6 has a capacity capable of storing data of at least one line (certain unit) of the manuscript image. When image data of one line is written in the memory 6, the I/F portion 7 reads the one-line image data from the memory 6, and transfers it to the computer 10 in the isochronous transfer mode. Subsequently, the I/F portion 7 reads the same image data as this transferred one-line image data from the memory 6, and again transfers it to the computer 10 in the isochronous transfer mode.

If it is now assumed that the resolution of the reader 4 is 300 dpi and the maximum manuscript sheet size is A3, the amount of binary one-line data is 440 bytes. Of course, if the read image data is not converted into the binary value but directly supplied in a multilevel, a larger capacity is necessary. Therefore, under these conditions, the memory 6 needs a capacity of at least 440 bytes. Moreover, if the amount of data (1 packet) to be transferred once in the isochronous transfer mode is 440 bytes or more, the one-line image data can be transferred in one cycle.

The reading process for each line by the reader 4 is continuously performed with a constant period. The image data transfer from the I/F portion 7 to the computer 10 is made faster than the reader 4 reads the manuscript image, and the periodic data transfer in the isochronous mode can be assured. Thereby, the memory 6 may have a capacity of at least one line. The I/F portion 7 re-transmits the image data, but the re-transmitted image data is the same as that first transferred in the isochronous transfer mode. Since the image data even including this re-transmitted image data can be much faster transferred than the reader 4 reads, the minimum capacity of the memory 6 is not necessary to change.

Although in this embodiment the image data first transferred in the isochronous transfer mode is successively re-transmitted in the next isochronous cycle, the present invention is not limited to this. As described above, the image data is transferred much faster than the reader 4 reads, so that many isochronous cycles come between the reading of a certain line and the reading of the next line. When there is no image data to be transferred in one of these isochronous cycles, the same image data can be re-transmitted in this free period.

In addition, when there is such a free period, dummy data as a free packet is transferred to the computer 10 in this free cycle. If the dummy data is periodically transmitted, the computer 10 can know that no trouble such as the stop of operation occurs in the image scanner 1. Of course, the status information (the presence or absence of any manuscript sheet or occurrence of jam) of the image scanner 1 can be transferred in place of the dummy data. Thus, the state of the image scanner 1 can be known in detail without separately providing the process for the transmission and reception of the status information.

Figure 17A:
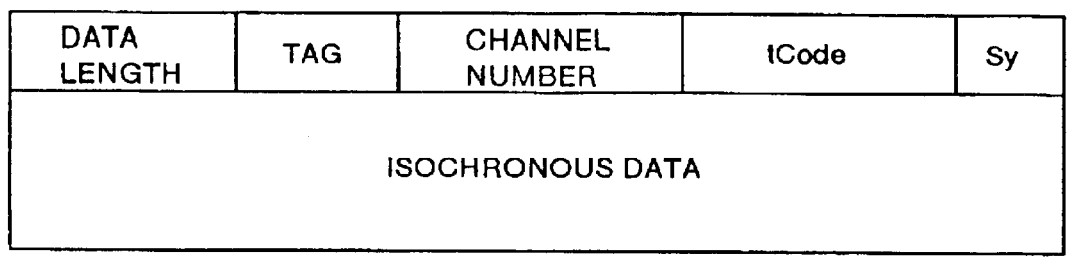
FIG. 17A shows an isochronous transfer format.
Figure 17B:
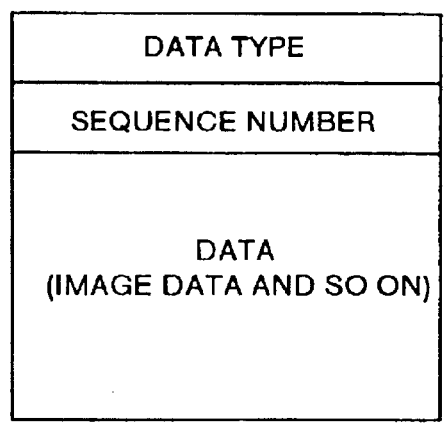
FIG. 17B shows isochronous data.

In the isochronous transfer, the data transfer is performed in the format shown in FIG. 17A. This isochronous transfer format includes the data length indicating the size of the data to be transferred, the TAG, the channel number, the tCode, the synchronizing bit Sy, and the transfer data (isochronous data). The computer 10 received data is required to decide if the received data is image data, status data or the other data. Thus, in this embodiment, the image scanner 1, as shown in FIG. 17B, adds header information, which includes the data type and the sequence number, to the isochronous data. In this case, the data type is the code indicating image data (0x01), status data (0x02), dummy data (0xff) or the other data. The sequence number is the serial number which the image scanner 1 adds to the image data read by the reader 4.

The image data having the same sequence number are successively transferred to the computer 10. Therefore, when the computer 10 cannot correctly receive the image data, it employs another image data having the same sequence number in place of the image data. Thereby, it is unnecessary to interrupt the processing or re-transmit data.

The image input apparatus according to the third embodiment will be described in detail with reference to an example of an actual image scanner. The construction of the image scanner is the same as that shown in FIGS. 4–7, and will not be described in detail.

Figure 19:
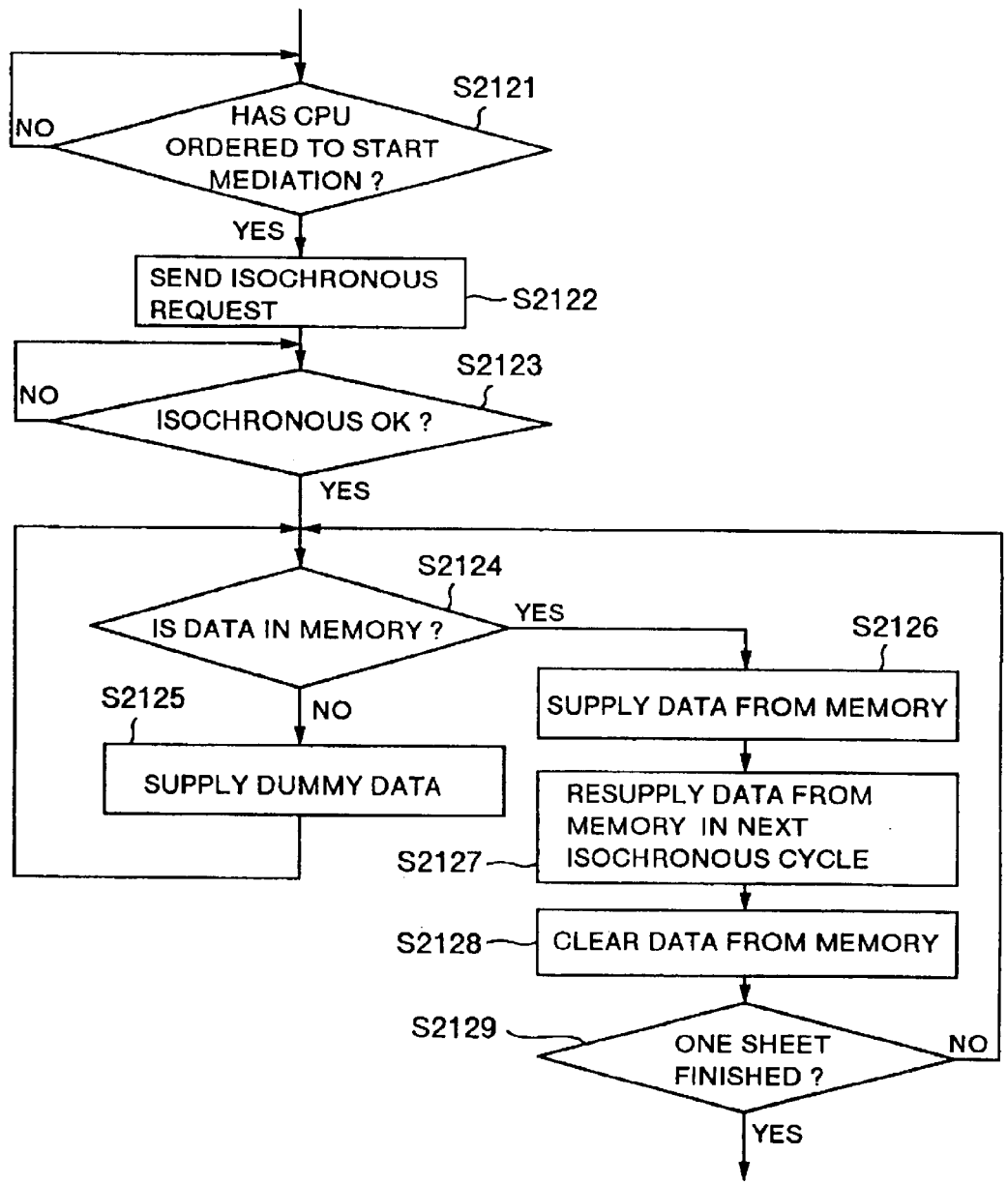
FIG. 19 is a flowchart of a process in an I/F portion.
Figure 20:
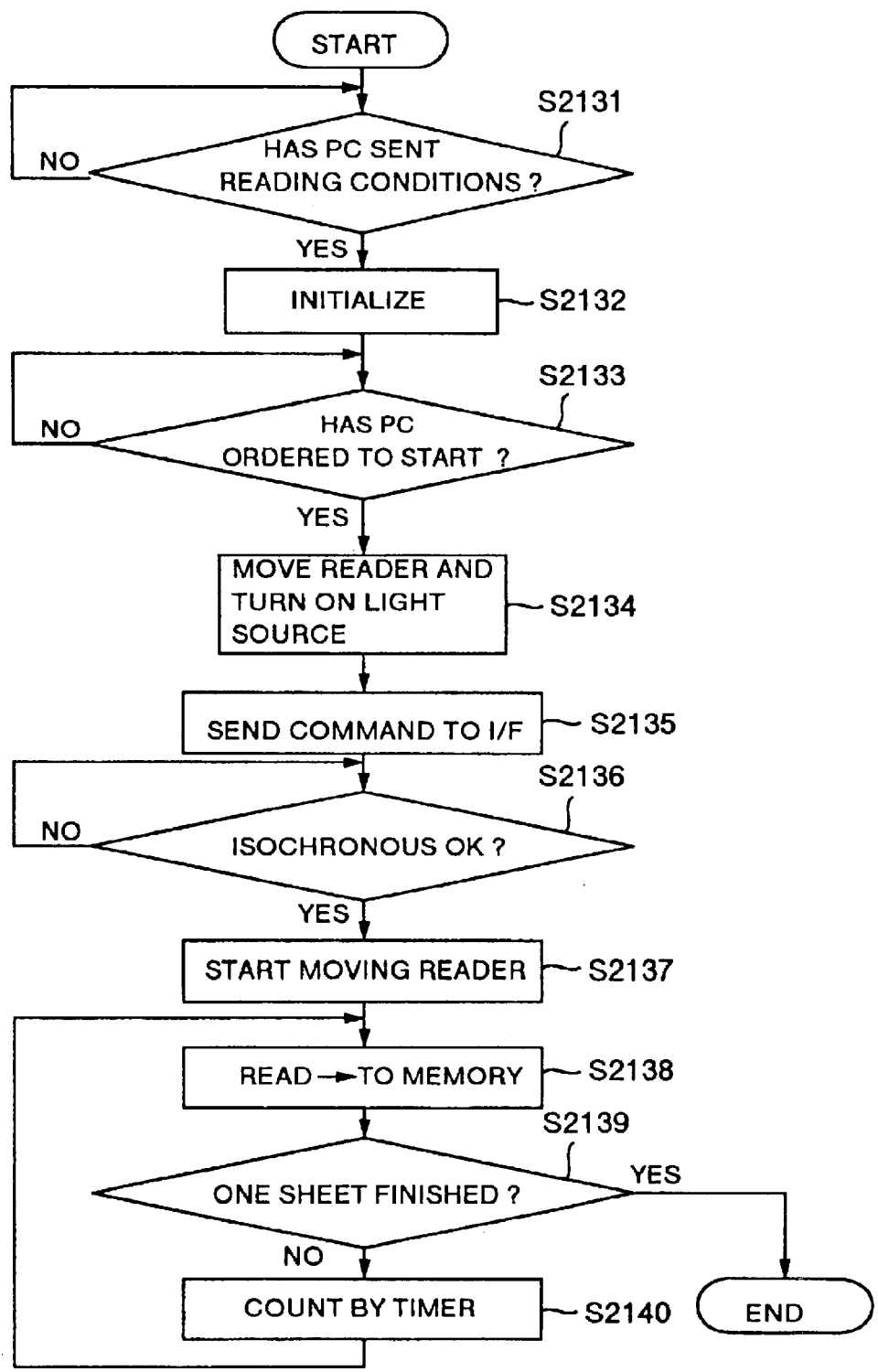
FIG. 20 is a flowchart of a reading process in an FB.

The reading processes for the case of using the ADF 13 (ADF case) and for the case of using the transparent glass 11b (FB case), in the image scanner according to the third embodiment will be described with reference to the flowcharts of FIGS. 18–20. FIG. 18 is a flowchart showing the reading process for the ADF case, FIG. 19 is a flowchart showing the reading process for the process in the I/F portion 7, and FIG. 20 is a flowchart showing the reading process for the FB case.

In the reading process for the ADF case, as illustrated in FIG. 18, the setting data for the reading conditions is first transferred from the computer 10 to the image scanner 1 in the asynchronous transfer mode (S2101). The CPU 2 uses this transferred setting data to initialize the image scanner 1 (S2102). At this time, the CPU 2 confirms if any manuscript sheet is present or absent on the feed hopper 14a.

Then, the CPU 2 waits for the computer 10 to issue the reading-start command (S2103). When the reading-start command is transferred from the computer 10 to the CPU 2 in the asynchronous transfer mode and received by the CPU 2, the light source of the reader 4 is turned on (S2104). The CPU 2 issues a command to the I/F portion 7 in order that the right to perform the isochronous transfer of image data can be acquired (S2105). The CPU 2 waits for the right to perform the isochronous transfer to be acquired (S2106), and then orders the carrier 3 to carry a manuscript sheet (S2107).

The CPU 2 waits until the sheet is carried from the hopper unit 14 to the manuscript sensor just before the read position 15b (S2108). The CPU 2 causes the timer to count a constant time when the fore end of the sheet is detected by the manuscript sensor, and forces the carrier to further carry the sheet until the fore end of the sheet arrives at the read position 15b (S2109). Then, the reader 4 reads only one line of the image on the sheet, and supplies it through the image processor 5 to the memory 6 where it is stored (S2110). After the one line is read, the timer counts a certain time (S2112), and then the reader reads the next line (S2110). The operations in steps S2110–S2112 are repeated to completely read all the images on the sheet (S2111).

At this time, the I/F portion 7 performs the process shown in FIG. 19.

When the I/F portion 7 receives a command to acquire the right to perform the isochronous transfer from the CPU 2 (S2121), it sends the isochronous request to the computer 10 (S2122), and waits until a channel is assigned to acquire the right to perform the isochronous transfer (S2123). The I/F portion 7, when acquiring this right, checks if the read one-line image data is stored in the memory 6 (S2124). If no image data is stored in the memory 6, the I/F portion 7 transfers dummy data to the computer 10 in the isochronous transfer mode (S2125). If image data is stored in the memory 6, the I/F portion 7 transfers the image data in the isochronous transfer mode (S2126). The operations in steps S2124–S2126 are repeated until all the images on one sheet can be completely transferred (S2127).

Thus, in the reading process for the ADF case, the time when the sheet starts to be read is uncertain. However, the image data can be surely and periodically transferred to the computer 10 immediately after the start of reading, so that the image data can be transferred to the computer 10 without delay. Further, in the reading process for the ADF case, it is very difficult to stop halfway the automatically fed sheet. However, the image scanner 1 according to this embodiment can transfer the image data from the small-capacity memory of one line to the computer 10 without interrupting the transfer of sheet.

Moreover, in the isochronous transfer mode in which the periodical data transfer can be assured but the correction of the communication error is not performed, when error occurs at the first time one-line image data is transmitted and received, the same data is re-transmitted and used so that the following process is performed by the computer 10. In addition, in this embodiment, since the transfer of image data to be transferred is successively repeated, the immediate correct treatment can be performed for the error occurring in this image data. The computer 10 does not need to wait until the data is re-transmitted. Moreover, the re-transmission of image data makes it possible to compare the first transferred image data with the next transferred image data, and to decide if there is transfer error according to the compared results.

In the reading process for the FB case, as illustrated in FIG. 20, the setting data for the reading conditions is first transferred from the computer 10 to the image scanner 1 in the asynchronous mode (S2131). The CPU 2 uses this transferred setting data to initialize the image scanner 1 (S2132).

Then, the CPU 2 waits for the computer 10 to issue the reading-start command (s2133). When receiving the reading-start command transferred from the computer 10 in the asynchronous mode, the CPU 2 causes the scanning module 15 to move to the position shown in FIG. 7B, and then forces the light source of the reader 4 to turn on (S2134). The CPU 2 orders the I/F portion 7 to acquire the right to perform the isochronous transfer of image data (S2134). The CPU 2 waits until the right to perform the isochronous transfer can be secured (S2136), and then causes the scanning module 15 to move in the sub-scanning direction (S2137).

Thereafter, the scanning module 15 reads one line of the image on the sheet, and supplies it through the image processor 5 to the memory 6 where it is stored (S2138). When the one-line image is read, the timer counts a certain time (S2140), and then the next line of the image is read (S2138). The operations in steps S2138–S2140 are repeated to completely read all images on one sheet (S2139). In the FB reading process, a positional shift is caused when the scanning module 15 is stopped halfway from being moved. However, the image scanner 1 according to this embodiment can transfer the image data using the small-capacity memory of one line to the computer 10 without interrupting the scanning module 15.

The IEEE standard 1394 interface of the image input apparatus according to this embodiment can be replaced by other interface such as USB having a transfer mode equivalent to the above-mentioned isochronous or asynchronous transfer mode.

According to the present invention, the following technical effects can be achieved.

(1) In the image input apparatus according to the first aspect of the present invention, the image data is transferred in the first mode in which the periodic transfer can be assured. Thereby, the image data read by the reading means can be periodically transferred to the other apparatus without staying in the image input apparatus, so that the capacity of the memory for storing the image data can be made as small as possible. Moreover, the control data is transferred in the second mode in which the periodic transfer cannot be assured, to the other apparatus which does not need the periodic transfer, so that the transfer band in the first mode can be effectively used.

(2) The image input apparatus according to the second aspect of the present invention can transmit the information about the image input apparatus to the other apparatus effectively utilizing the period in which the image data is not transferred.

(3) The image input apparatus according to the third aspect of the present invention can transmit the state of the image input until the image data transfer is started, to the other apparatus effectively utilizing the period in which the image data is not transferred. In addition, the image data is periodically transferred immediately after reading the manuscript sheet, so that no delay is occurs at the start of the image data transfer. As a result, the data transfer can be performed using the smallest-capacity memory.

(4) In the image input apparatus according to the fourth or fifth aspect of the present invention, the right to use the bus can be acquired until the image data on the next manuscript sheet starts to be processed. Thereby, the image data of a plurality of sheets can be periodically transferred with no interruption at each of successively fed sheets. As a result, it is possible to increase the image input processing speed. Also, the image data does not stay in the image input apparatus, so that the capacity of the memory for storing the image data can be made as small as possible.

(5) In the image input apparatus according to the sixth aspect of the present invention, the other apparatus receives the status data indicating the presence or absence of a sheet. Thereby, the other apparatus can know that the image data on the next sheet is to be successively transferred, so that the successive image data can be effectively processed.

(6) In the image input apparatus according to the seventh aspect of the present invention, the image data read by the reading means is periodically transferred to the other apparatus, and the same image data as this transferred image data is re-transmitted thereto. Thereby, the re-transmitted image data can be used to avoid from the interference by the error which might occur in the first transmission and reception of image data. In other words, the image data can be periodically transferred to the other apparatus irrespective of whether or not error occurs when the image data is transmitted and received. Thereby, the image data does not stay in the image input apparatus, so that the capacity of the memory for storing the image data can be made as small as possible.

(7) In the image input apparatus according to the eighth aspect of the present invention, the image data read by the reading means is periodically transferred to other apparatus, and the same data as this transferred image data is successively re-transmitted thereto. Thereby, this re-transmitted image data can be immediately used for the case in which error occurs when the image data is transmitted and received. That is, even at the other apparatus to which the image data is transferred, the time necessary for the image data to be processed can be decreased.

(8) In the image input apparatus according to the ninth aspect of the present invention, the image data can be periodically transferred every predetermined unit, so that the memory capacity can be set to that which corresponds to this predetermined unit.

What is claimed is:

1. An image input apparatus comprising:

a supply section that successively feeds a plurality of manuscript sheets;

a reading section that sequentially reads the plurality of manuscript sheets fed by the supply section; and a communication section that transfers image data of each of the plurality of manuscript sheets, which is read by the reading section, to another apparatus, wherein:

the communication section has a transfer mode in which a periodic data transfer can be assured, and transfers status data in the transfer mode after transferring one-sheet image data in the transfer mode, the status data indicating a state of the image input apparatus.

2. An image input apparatus comprising:

a supply section that successively feeds a plurality of manuscript sheets;

a reading section that sequentially reads the plurality of manuscript sheets fed by the supply section; and a communication section that transfers image data of each of the plurality of manuscript sheets, which is read by the reading section, to another apparatus, wherein:

the communication section has a transfer mode in which a periodic data transfer can be assured, transfers the image data of the plurality of manuscript sheets in the transfer mode, and transfers status data in the transfer mode in intervals between the image data of the plurality of manuscript sheets to be transferred, the status data indicating a state of the image input apparatus.

3. An image input apparatus according to claim 1, wherein the status data indicates whether or not there is any manuscript sheet in the supply section.

4. An image input apparatus according to claim 2, wherein the status data indicates whether or not there is any manuscript sheet in the supply section.

5. An image input apparatus comprising:

a reading section that reads a manuscript image; and a communication section that transfers image data, which is read by the reading section, to another apparatus, wherein:

the communication section has a transfer mode in which a periodic data transfer can be assured, transfers the image data in the transfer mode, and transfers the same image data as the transferred image data in a free period of the transfer mode.

6. An image input apparatus comprising:

a reading section that reads a manuscript sheet; and a communication section that transfers image data, which is read by the reading section, to another apparatus, wherein:

the communication section has a transfer mode in which a periodic data transfer can be assured, transfers the image data in the transfer mode, and successively transfers the same image data as the transferred image data in the transfer mode.

7. An image input apparatus according to claim 5, wherein the image data to be transferred is divided into predetermined units.

8. An image input apparatus according to claim 6, wherein the image data to be transferred is divided into predetermined units.

* * * * *